(12) United States Patent
Gerber

(10) Patent No.: US 12,182,869 B2
(45) Date of Patent: *Dec. 31, 2024

(54) SYSTEMS AND METHODS FOR MEASURING RELATIONSHIPS BETWEEN INVESTMENTS AND OTHER VARIABLES

(71) Applicant: Sander Gerber, New York, NY (US)

(72) Inventor: Sander Gerber, New York, NY (US)

(*) Notice: Subject to any disclaimer, the term of this patent is extended or adjusted under 35 U.S.C. 154(b) by 445 days.

This patent is subject to a terminal disclaimer.

(21) Appl. No.: 17/537,434

(22) Filed: Nov. 29, 2021

(65) Prior Publication Data

US 2022/0084126 A1 Mar. 17, 2022

Related U.S. Application Data

(63) Continuation-in-part of application No. 17/226,874, filed on Apr. 9, 2021, now Pat. No. 11,657,455, which is a continuation of application No. 15/948,962, filed on Apr. 9, 2018, now Pat. No. 10,991,047, which is a continuation of application No. 14/015,257, filed on Aug. 30, 2013, now Pat. No. 9,940,673, which is a continuation-in-part of application No. 13/601,386, filed on Aug. 31, 2012, now Pat. No. 8,577,775, and a continuation-in-part of application No. 13/601,310, filed on Aug. 31, 2012, now Pat. No. 10,140,661.

(60) Provisional application No. 61/769,963, filed on Feb. 27, 2013.

(51) Int. Cl.
*G06Q 40/00* (2023.01)
*G06Q 40/06* (2012.01)

(52) U.S. Cl.
CPC .................... *G06Q 40/06* (2013.01)

(58) Field of Classification Search
None
See application file for complete search history.

(56) References Cited

U.S. PATENT DOCUMENTS

| 6,003,018 | A | 12/1999 | Michaud et al. |
| 6,564,191 | B1 | 5/2003 | Reddy |
| 7,624,069 | B2 | 11/2009 | Padgette |
| 7,904,368 | B2 | 3/2011 | Weinstein et al. |
| 8,577,775 | B1 | 11/2013 | Gerber |

(Continued)

OTHER PUBLICATIONS

"Anscombe's quartet", Wikipedia, May 19, 2012, retrieved Aug. 28, 2012 from URL: http://en.wikipedia.org/wiki/Anscombe%27s.sub.-quartet (3 pages).

"Correlation and Dependence", Wikipedia, Aug. 10, 2012, retrieved Augus 28, 2012 from URL: http://en.wikipedia.org/wiki/Correlation_and_dependence (8 pages).

(Continued)

*Primary Examiner* — Olabode Akintola
(74) *Attorney, Agent, or Firm* — FOLEY & LARDNER LLP

(57) ABSTRACT

The systems and methods described herein can identify meaningful relationships between variables, such as particular investments or general asset classes. Unlike conventional correlation analysis, these systems and methods provide an improved technique of co-movement analysis that implements a threshold to eliminate data "noise" and then discretizes the remaining observations to normalize any outliers. Such co-movement analysis has numerous advantages over known techniques for characterizing relationships between variables.

25 Claims, 11 Drawing Sheets

(56) References Cited

U.S. PATENT DOCUMENTS

| | | | |
|---|---|---|---|
| 8,903,733 B2 | 12/2014 | Mason | |
| 9,940,673 B2 * | 4/2018 | Gerber | G06Q 40/06 |
| 10,991,047 B2 * | 4/2021 | Gerber | G06Q 40/06 |
| 11,657,455 B2 * | 5/2023 | Gerber | G06Q 40/06 424/443 |
| 2002/0111891 A1 | 8/2002 | Hoffman et al. | |
| 2002/0178096 A1 | 11/2002 | Marshall | |
| 2003/0088492 A1 | 5/2003 | Damschroder | |
| 2004/0172357 A1 | 9/2004 | Padgette | |
| 2005/0278234 A1 | 12/2005 | Wagner et al. | |
| 2006/0010065 A1 | 1/2006 | Howorka | |
| 2006/0041491 A1 | 2/2006 | Smith et al. | |
| 2006/0149674 A1 | 7/2006 | Cook et al. | |
| 2006/0277134 A1 | 12/2006 | Glinberg et al. | |
| 2006/0282380 A1 | 12/2006 | Birney et al. | |
| 2007/0143179 A1 | 6/2007 | Eyal et al. | |
| 2007/0294158 A1 | 12/2007 | Patel et al. | |
| 2008/0288308 A1 | 11/2008 | Penney et al. | |
| 2009/0119226 A1 | 5/2009 | Kurczek et al. | |
| 2009/0187509 A1 | 7/2009 | McNamee et al. | |
| 2009/0228318 A1 | 9/2009 | Ara et al. | |
| 2009/0292635 A1 | 11/2009 | Sinclair et al. | |
| 2010/0218115 A1 | 8/2010 | Curtin et al. | |
| 2010/0223200 A1 | 9/2010 | Balson et al. | |
| 2010/0250467 A1 | 9/2010 | Weinstein et al. | |
| 2011/0016060 A1 | 1/2011 | Korzinin | |
| 2012/0036086 A1 * | 2/2012 | Caputo | G06Q 40/06 705/36 R |
| 2012/0047090 A1 | 2/2012 | Gunther | |
| 2012/0123967 A1 | 5/2012 | Glinberg et al. | |
| 2012/0317055 A1 | 12/2012 | Glinberg et al. | |
| 2014/0067713 A1 | 3/2014 | Gerber | |

OTHER PUBLICATIONS

Alloway, Tracy, "JPMorgan loss stokes risk model fears", Financial Times, May 13, 2012, retrieved May 14, 2012 from URL: http://www.ft.com/intl/cms/s/0/1293de8c-9ba2-11e1-b03c-00144feabdc0.html (3 pages).

Cukier et al., "The Rise of Big Data: How It's Changing the Way We Think About the World", Foreign Affairs, May/Jun. 2013, pp. 28-40 (7 pages).

Hackman, "Mean-Variance Portfolio Analysis and the Capital Asset Pricing Model", Course Notes, Georgia Institute of Technology, 2011, pp. 1-27 (27 pages).

International Search Report and Written Opinion for PCT/US2013/057521 dated Feb. 7, 2014 (20 pages).

Krawcheck, Sallie, "JPMorgan shows fighting complexity is futile", Financial Times, May 23, 2012, retrieved May 29, 2012 from URL: http://www.ft.com/intl/cms/s/0/3efae110-a4c0-11e1-9a94-00144feabdc0.html (3 pages).

Markowitz, Harry, "Portfolio Selection", The Journal of Finance, 1952, vol. 7, No. 1., pp. 77-91 (15 pages).

Markowitz, Portfolio Selection: Efficient Diversification of Investment, Chapters 1, 2, and 8, pp. 3-35 and 154-187, Blackwell Publishers, 1991.

Penacchi, "Chapter 2: Mean-Variance Analysis", 2008, pp. 37-89 (53 pages).

Ritholz, Barry, "JPMorgan's debacle and its parallels to AIG", The Washington Post, May 19, 2012, retrieved May 22, 2012 from URL: http://www.washingtonpost.com/jpmorgans-debacle-and-its-parallels-to-aig/2012/05/18/gIQAPJxLbU_print.html (3 pages).

Sommer, Jeff, "Before Leaping, Listen to a Giant", The New York Times, May 19, 2012, retrieved Aug. 29, 2012 (4 pages).

* cited by examiner $$510 \rightarrow GS = \frac{N_{A=1,B=1} + N_{A=-1,B=-1} - N_{A=-1,B=1} - N_{A=1,B=-1}}{N_{A=1,B=1} + N_{A=-1,B=-1} + N_{A=-1,B=1} + N_{A=1,B=-1}} = \frac{N_{A=1,B=1} + N_{A=-1,B=-1} - N_{A=-1,B=1} - N_{A=1,B=-1}}{N_{tot} - N_{A=0} - N_{B=0} + N_{A=0,B=0}}$$

$$520 \rightarrow GS1 = \frac{N_{A=1,B=1} + N_{A=-1,B=-1} - N_{A=-1,B=1} - N_{A=1,B=-1}}{N_{tot} - N_{A=0,B=0}}$$

$$530 \rightarrow GS2 = \frac{N_{A=1,B=1} + N_{A=-1,B=-1} - N_{A=-1,B=1} - N_{A=1,B=-1}}{\sqrt{N_{A=1} + N_{A=-1}} \sqrt{N_{B=1} + N_{B=-1}}}$$

| | 10830-ALXN | | 12369-BABA | | 12459-China Datac. | | 13058-BIG BANKS | | 14525-VIV FP | | 14726-PORTFOLIO HEDGE | | 14777-IAC | | 834-REVERSION | | 15553-CLNY | | 16042-PLBY | | 16454-PRCH | | 9257-LBRDA | | GS_HF_LS | | 14846-LEGIN | | 15210-FLWS | | 16317-HOME BUIL... | | 16676-GPRO | | DJTM NMO | |
|---|---|---|---|---|---|---|---|---|---|---|---|---|---|---|---|---|---|---|---|---|---|---|---|---|---|---|---|---|---|---|---|---|---|---|---|---|
| | # | Pct | # | Pct | # | Pct | # | Pct | # | Pct | # | Pct | # | Pct | # | Pct | # | Pct | # | Pct | # | Pct | # | Pct | # | Pct | # | Pct | # | Pct | # | Pct | # | Pct | # | Pct |
| 10830 - ALXN | 10 | 100% | 10 | 60% | 10 | -20% | 10 | -80% | 10 | -20% | 10 | -80% | 10 | -40% | 10 | 0% | 10 | -80% | 10 | 20% | 10 | 0% | 10 | 0% | 9 | -56% | 9 | -55% | 9 | 100% | 9 | 11% | 9 | -78% | 9 | 11% |
| 12369 - BABA | 10 | 60% | 10 | 100% | 10 | -60% | 10 | -40% | 10 | -20% | 10 | -80% | 10 | -40% | 10 | 40% | 10 | -80% | 10 | 20% | 10 | 40% | 10 | -40% | 9 | 56% | 9 | -56% | 9 | 56% | 9 | -33% | 9 | -78% | 9 | -33% |
| 12459 - China Datacenters | 10 | -20% | 10 | -60% | 10 | 100% | 10 | 0% | 10 | 20% | 10 | 40% | 10 | 0% | 10 | 40% | 10 | 40% | 10 | 20% | 10 | -80% | 10 | 40% | 9 | 33% | 9 | 33% | 9 | -33% | 9 | 11% | 9 | 56% | 9 | 56% |
| 13058 - BIG BANKS | 10 | -80% | 10 | -40% | 10 | 0% | 10 | 100% | 10 | 0% | 10 | 60% | 10 | 20% | 10 | 0% | 10 | 60% | 10 | -40% | 10 | -20% | 10 | -20% | 9 | 33% | 9 | 33% | 9 | -78% | 9 | 11% | 9 | 56% | 9 | -33% |
| 14525 - VIV FP | 10 | -20% | 10 | -20% | 10 | 20% | 10 | 0% | 10 | 100% | 10 | 40% | 10 | 40% | 10 | 20% | 10 | 0% | 10 | -20% | 10 | 0% | 10 | 0% | 9 | 11% | 9 | 11% | 9 | -11% | 9 | -56% | 9 | -11% | 9 | 33% |
| 14726 - PORTFOLIO HEDGE | 10 | -80% | 10 | -80% | 10 | 0% | 10 | 60% | 10 | 40% | 10 | 100% | 10 | 20% | 10 | -40% | 10 | 60% | 10 | -40% | 10 | -20% | 10 | 20% | 9 | 33% | 9 | 78% | 9 | -78% | 9 | 11% | 9 | 56% | 9 | 11% |
| 14777 - IAC | 10 | -40% | 10 | -40% | 10 | 0% | 10 | 20% | 10 | 40% | 10 | 20% | 10 | 100% | 10 | -20% | 10 | -20% | 10 | 0% | 10 | 20% | 10 | 20% | 9 | 78% | 9 | -11% | 9 | -33% | 9 | -33% | 9 | 56% | 9 | 11% |
| 14834 - REVERSION | 10 | 0% | 10 | 40% | 10 | 20% | 10 | 20% | 10 | 40% | 10 | -20% | 10 | -60% | 10 | 100% | 10 | -20% | 10 | 40% | 10 | -20% | 10 | -20% | 9 | -33% | 9 | -33% | 9 | -11% | 9 | 33% | 9 | -11% | 9 | -11% |
| 15553 - CLNY | 10 | -80% | 10 | -80% | 10 | 40% | 10 | 60% | 10 | 0% | 10 | 60% | 10 | 60% | 10 | -20% | 10 | 100% | 10 | 0% | 10 | -20% | 10 | 20% | 9 | 78% | 9 | 33% | 9 | -78% | 9 | 11% | 9 | 100% | 9 | 11% |
| 16042 - PLBY | 10 | 20% | 10 | 20% | 10 | 20% | 10 | -40% | 10 | -20% | 10 | -40% | 10 | 0% | 10 | 40% | 10 | 0% | 10 | 100% | 10 | 0% | 10 | 0% | 9 | 33% | 9 | -56% | 9 | 11% | 9 | 11% | 9 | 11% | 9 | 56% |

SYSTEMS AND METHODS FOR MEASURING RELATIONSHIPS BETWEEN INVESTMENTS AND OTHER VARIABLES

CROSS-REFERENCE TO RELATED APPLICATIONS

This application is a continuation-in-part application of U.S. patent application Ser. No. 17/226,874, entitled "SYSTEMS AND METHODS FOR MEASURING RELATIONSHIPS BETWEEN INVESTMENTS AND OTHER VARIABLES," filed Apr. 9, 2021, which is a continuation of U.S. patent application Ser. No. 15/948,962, entitled "SYSTEMS AND METHODS FOR MEASURING RELATIONSHIPS BETWEEN INVESTMENTS AND OTHER VARIABLES," filed Apr. 9, 2018, which is a continuation of U.S. patent application Ser. No. 14/015,257, entitled "SYSTEMS AND METHODS FOR MEASURING RELATIONSHIPS BETWEEN INVESTMENTS AND OTHER VARIABLES," filed Aug. 30, 2013, which claims priority to U.S. Provisional Patent Application Ser. No. 61/769,963, entitled "SYSTEMS AND METHODS FOR MEASURING RELATIONSHIPS BETWEEN INVESTMENTS AND OTHER VARIABLES," filed Feb. 27, 2013, each of which are incorporated by reference in their entirety.

U.S. patent application Ser. No. 14/015,257 is also a continuation-in-part of U.S. patent application Ser. No. 13/601,310, entitled "SYSTEMS AND METHODS FOR MANAGING INVESTMENTS," filed Aug. 31, 2012, each of which are incorporated by reference in their entirety.

U.S. patent application Ser. No. 14/015,257 is also a continuation-in-part of U.S. patent application Ser. No. 13/601,386, entitled "SYSTEMS AND METHODS FOR MANAGING INVESTMENTS," filed Aug. 31, 2012, each of which are hereby incorporated by reference in their entirety.

TECHNICAL FIELD

This invention relates generally to systems and methods for measuring and visualizing investments and other variables.

BACKGROUND

The primary objective of the investment management industry is to maximize returns while minimizing risk. The process of assimilating various investments into a portfolio that accomplishes this objective is one of the primary challenges for the industry. With the rise of sophisticated investment strategies and products, the portfolio construction process only becomes more difficult as managers perform analysis across a wider variety of asset classes, sectors and markets and attempt to quantify increasingly complex relationships. While conceptually sound techniques for optimal portfolio construction have existed for many years, the various assumptions underlying these techniques have not evolved with financial markets. Conventional tools and statistics used in modern portfolio construction suffer from flaws in both assumptions and application. The tools incorrectly assume that a single relational model (e.g., linear, curvilinear) or even multiple relational models can define the complex and dynamic relationships between financial variables. In addition, practitioners using conventional tools often prioritize statistical significance over economic significance. In doing so, practitioners prioritize the "fit" of a model over identifying potential relationships more important to profit and loss. As a result, the financial industry has struggled to construct portfolios with optimum levels of risk and return.

Moreover, conventional tools do not provide a visual representation of the assets and how they relate to each other in a manner that is easy to digest for the viewer. In high-pressure and time-sensitive environments, where financial data changes rapidly, representing portfolio analysis in a manner that can be understood easily and quickly is highly desirable.

SUMMARY

In an attempt to better measure relationships between asset classes, sectors and markets, the systems and methods described herein establish a framework that can provide for portfolio construction with improved levels of risk and/or return. Analysts have conventionally relied on correlation models, but these statistics often fail to identify important relationships or place too much emphasis on trivial relationships. For example, a model based on correlation may be entirely insufficient when a long-term trend undergoes a sudden or even gradual change.

The systems and methods described herein enable optimal portfolio construction based on a new relationship model providing numerous improvements over conventional analysis, such as correlation. Further, the framework described herein allows for additional portfolio risk analysis based on this new relationship model. The systems and methods can identify previously hidden relationships between two or more variables, further characterize known relationships between variables or even reveal when there is no significant relationship between variables. The systems and methods described herein can also enable hedging complex derivative products and/or hybrid options (e.g., what is traded and/or embedded in longer-dated structured products). These products generally lean on covariance, which can under-state directionality and create unnecessarily large hedging costs.

The systems and methods described herein can inform hedging of complex derivative products and/or "hybrid options" (e.g. options that are explicitly or implicitly contained in longer-dated structured products). Hedges for such products generally rely on covariance and therefore may understate directionality and/or result in unnecessarily large hedging costs.

The systems and methods described herein have multiple applications in the field of finance and investment management. For example, the framework can identify previously unknown relationships between asset classes, sectors and markets. In some embodiments, the framework disclosed herein can be used to analyze relationships between asset classes in times of market stress, which are typically indicated by large price movements. For example, this framework can be used to identify meaningful relationships that arise when an asset moves more than a threshold amount (e.g., identifying which asset classes move more than five percent when a general equity index moves more than five percent). In some embodiments, the systems and methods described herein can enhance the application of mean-variance optimization in portfolio construction. Mean-variance portfolio optimization was developed by Professor Harry Markowitz of San Diego, California, and this method is widely used in the investment management industry for portfolio construction and management. The systems and methods described herein can produce covariance measures that better model co-movement between financial variables, thereby improving mean-variance optimization. Furthermore, the systems and methods described herein, when applied to the same input data, provide more forward-looking and robust measures of expected return and risk, thereby better identifying true risk-adjusted returns. The framework described herein can also provide insight beyond the particular variables under analysis, often revealing external trends that may affect those variables (e.g., buy-side trends in the marketplace).

The systems and methods described herein have additional applications outside of finance and investment management. For example, the current framework can be applied to sport statistics, behavioral statistics, employment statistics, real estate statistics, or any other measurable objective data to identify relationships between variables. More generally, the systems and methods described herein can be used in any field in which two or more variables behave according to a relationship that cannot be fully represented by existing analytical tools.

Additional features and advantages of various embodiments will be set forth in the description which follows, and in part will be apparent from the description. Other advantages will be realized and attained by the structure particularly pointed out in the exemplary embodiments in the written description and claims hereof as well as the appended drawings.

In one embodiment, a method comprises retrieving, by a server, performance data for a plurality of data records within an observation period; for at least one pair of data records within the plurality of data records, determining, by the server, whether a first data record of a pair of data records and a second data record of the pair of data records have a positive union or a negative union based on each instance in which a respective value of the performance data for each data record is above an upper threshold or below a lower threshold for the first data record or the second data record; displaying, by the server on a graphical user interface, a representation of the positive or negative union; and in response to receiving an indication of interaction with the representation of the positive or negative union, dynamically revising, by the server, the graphical user interface by displaying, for the pair of data records, a visual indicator within four regions, wherein: a first region represents positive union with respect to the upper threshold and the lower threshold, a second region represents negative union with respect to the upper threshold and the lower threshold, a third region represents positive union with respect to the lower threshold and negative union with respect to the upper threshold, and a fourth region represents negative union with respect to the lower threshold and positive union with respect to the upper threshold.

The method may also display a fifth region representing performance data associated with data records that are between the upper threshold and the lower threshold.

In another embodiment, a computer system comprises a processor and a non-transitory computer-readable medium containing instructions that when executed by the processor cause the processor to perform operations comprising: retrieving performance data for a plurality of data records within an observation period; for at least one pair of data records within the plurality of data records, determining whether a first data record of a pair of data records and a second data record of the pair of data records have a positive union or a negative union based on each instance in which a respective value of the performance data for each data record is above an upper threshold or below a lower threshold for the first data record or the second data record; displaying, on a graphical user interface, a representation of the positive or negative union; and in response to receiving an indication of interaction with the representation of the positive or negative union, dynamically revising the graphical user interface by displaying, for the pair of data records, a visual indicator within four regions, wherein: a first region represents positive union with respect to the upper threshold and the lower threshold, a second region represents negative union with respect to the upper threshold and the lower threshold, a third region represents positive union with respect to the lower threshold and negative union with respect to the upper threshold, and a fourth region represents negative union with respect to the lower threshold and positive union with respect to the upper threshold.

In another embodiment, a method comprises retrieving, by a server, at least one of an observation period, an upper threshold, or a lower threshold from a template; for at least one pair of data records within a plurality of data records, determining, by the server, whether a first data record of a pair of data records and a second data record of the pair of data records have a positive union or a negative union based on each instance in which a respective value of a performance data for each data record is above an upper threshold or below a lower threshold for the first data record or the second data record; displaying, by the server on a graphical user interface, for the pair of data records, a visual indicator within four regions, wherein: a first region represents positive union with respect to the upper threshold and the lower threshold, a second region represents negative union with respect to the upper threshold and the lower threshold, a third region represents positive union with respect to the lower threshold and negative union with respect to the upper threshold, and a fourth region represents negative union with respect to the lower threshold and positive union with respect to the upper threshold.

In yet another embodiment, a method comprises retrieving, by a server, performance data for a plurality of data records within an observation period; for at least one pair of data records within a plurality of data records, determining, by the server, whether a first data record of a pair of data records and a second data record of the pair of data records have a positive union or a negative union based on each instance in which a respective value of the performance data for each data record is above an upper threshold or below a lower threshold for the first data record or the second data record; displaying, by the server on a graphical user interface, for the pair of data records, a visual indicator within four regions, wherein: a first region represents positive union with respect to the upper threshold and the lower threshold, a second region represents negative union with respect to the upper threshold and the lower threshold, a third region represents positive union with respect to the lower threshold and negative union with respect to the upper threshold, and a fourth region represents negative union with respect to the lower threshold and positive union with respect to the upper threshold; and dynamically increasing, by the server, a length of the observation period based on a confidence score for the positive or negative union.

It is to be understood that both the foregoing general description and the following detailed description are exemplary and explanatory and are intended to provide further explanation.

BRIEF DESCRIPTION OF THE DRAWINGS

The preferred embodiments of the present invention are illustrated by way of example and not limited to the following figures:

FIGS. 5A-5B depict different methods used for portfolio construction and for comparing two variables, according to an embodiment.

FIGS. 6-9 depict various graphical user interfaces displayed, according to an embodiment.

DETAILED DESCRIPTION

Figure 1:
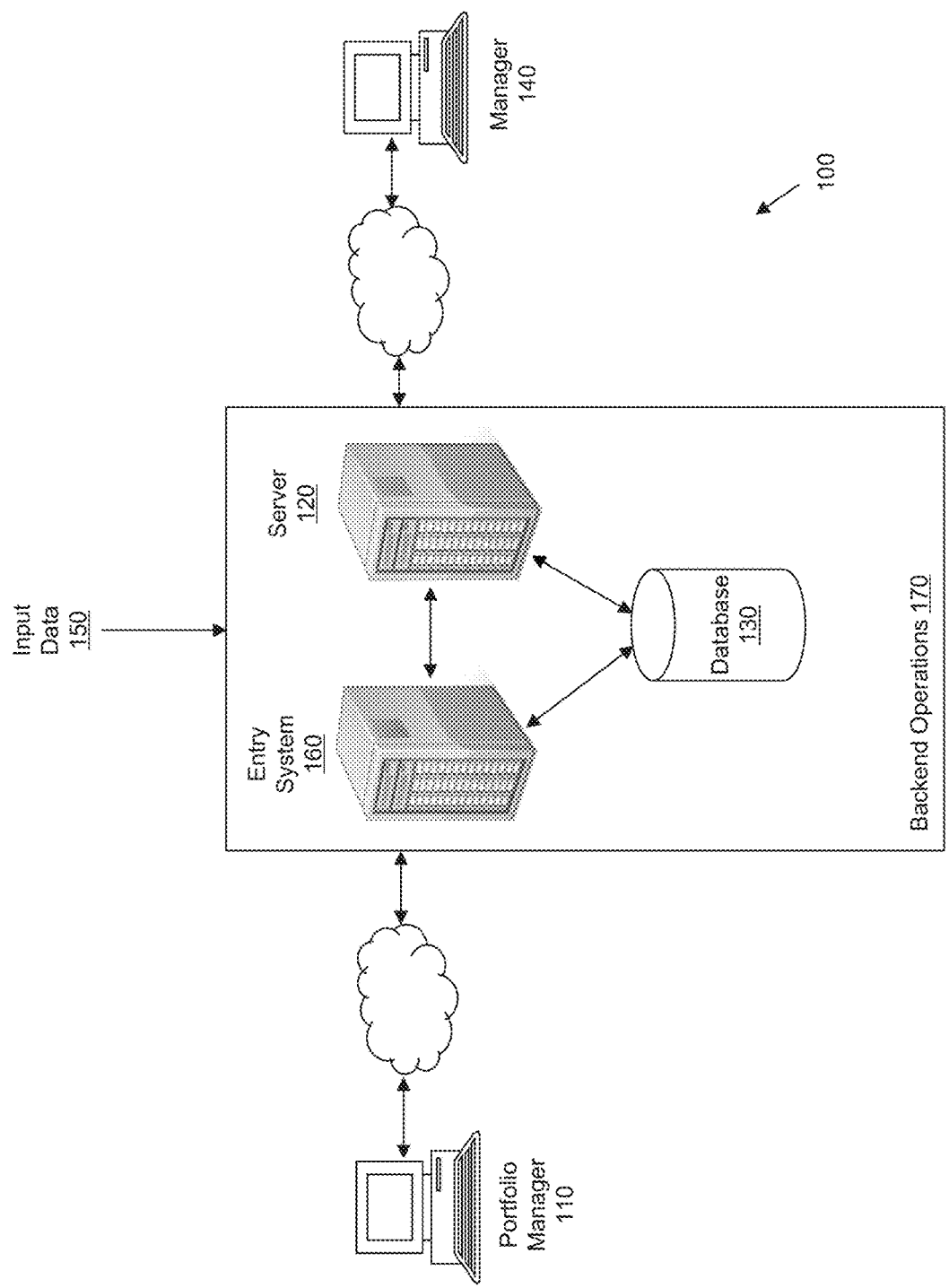
FIG. 1 depicts a system architecture, according to an embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

The embodiments described herein attempt to identify previously hidden relationships between two or more variables or further characterize known relationships between variables. This information has many applications in the field of finance and investment management. For example, information about the relationships between multiple variables (e.g., asset classes, deal codes, investment strategies, and/or sectors or markets) can be used as an input during portfolio construction, such as a measure of covariance across different variables. In another example, when managing multiple investments, it may be useful to analyze relationships between the investments to determine whether those investments are truly independent investments.

The current framework provides numerous advantages over known techniques for measuring relationships between variables. Such conventional techniques often rely on regression analysis, which can have several shortcomings. Regression analysis, as used herein, may refer to the commonly used ordinary least squares linear regressions encompassing an entire data population. For example, regression analysis typically relies upon many data points to represent every movement of the variables, but many of these movements may be minor changes that do not provide any significant insight into the relationship between the two variables. In other words, regression analysis often incorporates "noise" by including too many inconsequential data points. As another example, regression analysis typically incorporates data points covering every movement over an extended period of time, but certain relationships, such as those in financial markets, can change drastically in relatively short periods of time. When such a change occurs, a large number of data points from the distant history may improperly weight the results and minimize the effect of a more recent, substantial movement. As another example, typical regression analysis can rely on $R^2$ calculations, which use a straight line fit, but relationships in the financial markets often do not follow straight line relationships.

Generally, the systems and methods described herein can measure the relationship between variables by determining when the variables exceed a minimum absolute value change in the same or opposite directions. The relationship between variables, as described herein, is known as the "Gerber relationship." The Gerber relationship between two or more variables (e.g., asset classes, sectors, or markets) is an alternative measure of co-movement between those variables. A Gerber relationship between variables can be a positive relation (e.g., both variables generally move in the same direction at the same time) or a negative relation (e.g., both variables generally move in opposite directions at the same time). A large positive relation may signify that the variables typically move in the same direction, while a large negative relation may signify that the variables typically move in opposite directions.

In contrast to conventional techniques, the systems and methods described herein can incorporate a threshold for filtering data points reflecting smaller variable movements that do not have any economic significance. In some embodiments, a threshold may be applied such that the Gerber relationship only considers data points reflecting a change greater than a predetermined magnitude. For example, when measuring the Gerber relationship between two asset classes, a threshold may be applied such that relatively minor changes in the value of either asset class can be filtered from the analysis. Any movement less than the threshold may be considered "noise," and filtering out those data points below the threshold may be desirable because they are likely to erroneously skew the analysis. After applying a threshold to filter out noise, the remaining data points may be used to measure the Gerber relationship between the variables. Accordingly, the Gerber relationship can overcome the problem of data noise caused by conventional technique's over-inclusion of historical data in favor of more immediate, significant data about the variables.

In some embodiments, the systems and methods described herein may also apply a discretization process such that all data points exceeding the threshold are given equal weight. For example, when measuring the Gerber relationship between two asset classes, data points passing the threshold may be discretized such that a modest movement barely exceeding the threshold is given the same weight as a massive movement that exceeds the threshold ten-fold. Any massive movement might be conventionally considered an outlier, and therefore, its magnitude could have been considered to erroneously skew an analysis. However, the event of the massive movement may still be incorporated into this analysis because it has been discretized. In summary, measuring a Gerber relationship can include implementing a threshold to eliminate data noise and then discretizing the remaining observations to normalize any outliers while still incorporating these economically significant observations into the analysis.

Generally, the systems and methods described herein can calculate a statistic quantifying the Gerber relationship between variables. This statistic representing the Gerber relationship, as described herein, is known as the "Gerber statistic." In some embodiments, the Gerber statistic can be a positive or negative number reflecting the relative direction and strength of the relationship. Calculating the Gerber statistic may include counting the number of instances when values of both variables changed beyond a threshold and considering whether those changes were both in the same direction or in opposite directions. Instances when both variables move beyond the threshold and in the same direction (i.e., have a positive relation) are referred to herein as "positive unions," while instances when both variables move beyond the threshold and in opposite directions (i.e., have a negative relation) are referred to herein as "negative unions." Only periods in which both variables have movements beyond the threshold may be considered when calculating the Gerber statistic.

In some embodiments, a Gerber statistic can be a number between −100% and +100% that characterizes the Gerber relationship between a pair of variables. In one example of calculating a Gerber statistic, a threshold value can be set at a predefined percentage value of the underlying assets (e.g., 1%) for a period of 10 days. During those 10 days, a first variable and a second variable may have movements in the same or opposite directions. Each time period in which the movements of both of these variables exceed the threshold value can be compared to determine the co-movement of the variables. One example method for calculating the Gerber statistic can include determining the number of positive unions minus the number of negative unions, all divided by a number of total unions. Alternatively, the Gerber statistic can be calculated by determining the number of positive unions minus a number of negative unions, all divided by the length of the period. The Gerber statistic is not intended to be limited to any particular formula, but can include any calculation of co-movement where a threshold is applied to eliminate noise, and the remaining observations are compared for positive unions, negative unions, or both positive and negative unions.

In another example of calculating a Gerber statistic, there are 5 of the 10 days where the value of the first variable moved more than the threshold value. During those 5 days, the second variable only moved more than the threshold value 4 times. Therefore, the number of total unions is 4. During 3 of those 4 days, the first and second variables moved in the same direction (e.g., both positive or both negative), so the number of positive unions is 3. During the 1 remaining day from those 4 days, the first and second variables moved in the opposite directions (e.g., one positive and one negative), so the number of negative unions is 1. In this example, the Gerber statistic can be calculated as (3−1)/4, which is 50%. By implementing a threshold, any insignificant movements under the threshold value of $50,000 can be eliminated from the comparison. The remaining movements that exceed the threshold are discretized. If one movement was $300,000 and another movement was $70,000, these amounts are considered movements above the threshold value, but the magnitude above the threshold is not considered pertinent to the measure. Each movement above the threshold value is given equal weight, so a value conventionally considered an "outlier" would not skew these results.

In some embodiments, a Gerber statistic near −100% may indicate that the two variables have a high negative Gerber relationship. In other words, when the two variables both experience large movements, they typically move in opposite directions. On the other hand, a Gerber statistic close to 100% may indicate that the two variables have a high positive relation. In other words, when the two variables both experience large movements, they typically move in the same direction. Additionally, a Gerber statistic around 0% may indicate that the two variables do not have any movements beyond the threshold or a relatively equal number of positive and negative unions.

The systems and methods described herein can determine a Gerber relationship and calculate a Gerber statistic. Upon identifying variables, the systems and methods can retrieve the appropriate historical data to measure the Gerber relationship and calculate the Gerber statistic. As described herein, the systems and methods can comprise a computer program embodied on a computer-readable medium that can automatically perform the functions described herein, retrieve information to perform these functions, and display or output the results on a graphical user interface or provide the results to another system for further processing.

In some configurations, the methods and systems described herein can be used to calculate relationships between financial variables in order to evaluate strategies in which the relationship between different asset returns is critical to determining the probability of large loss. In turn, the probability of large loss is critical in determining appropriate investment leverage and/or the cost insuring against such a loss. These products include: (i) investments with open-ended loss potential but defined and non-recourse capital commitment; and (ii) specific cases of option replications involving multiple asset classes. The Gerber Statistic allows investors and intermediaries to better model, visualize, interpret, and ultimately invest in such products.

In one example, consider an investment in a multi-strategy hedge fund which delivers consistently positive returns with high returns per unit of realized volatility, but low levels of absolute performance. For example, a fund could deliver 5% absolute return with 2.5% daily annualized volatility employing a combination of ten different underlying strategies. Most investors would consider such returns attractive due to the 2.0 Sharpe ratio (assuming interest rates at zero for simplicity). However, these returns are less attractive in the context of earning sufficient absolute return on un-levered capital. By employing the methods and systems discussed herein (e.g., the Gerber Statistic), the investor and/or intermediary can visualize the frequency of times when the multi-strategy hedge fund would face losses greater certain threshold on unlevered capital. More precisely, using such a visualization, market participants could determine the likelihood of the fund delivering returns below a threshold X % (most commonly −100%) with an inputted statistical confidence level (e.g., 99%). Such a calculation would be more precise and relevant than a correlation analysis which would over-weight small upside moves relative to more important large downside moves. Further, calculating a Gerber Statistic based on a combination of individual strategy returns is superior to merely looking at the historic performance of the fund as fund allocations to different strategies are dynamic through time.

When using the methods and systems discussed herein, a computer system can allow an investor to select a degree of leverage to achieve a target absolute return while formally quantifying the frequency of large losses which would wipe out existing capital and require further commitment. Similarly, an intermediary could use the Gerber Statistic and statistical confidence interval around the Gerber Statistic to appropriately price an insurance policy or put against such an event. With an insurance policy (e.g., put) in place, the multi-strategy hedge fund investment can offer sufficiently high levered returns while functioning more like a "long only" allocation where the investor's maximum loss is capital invested. We see multiple benefits of using the Gerber Statistic when calculating risk and pricing puts (e.g., insurance) on multi-strategy hedge fund investments. The end investor accesses an investment which would be otherwise un-accessible or un-economic. In particular, retail investors could benefit from such access, as they are often otherwise credit-constrained against taking leverage which could result in losses beyond initial capital committed. Said differently, the Gerber Statistic could expand the breadth of "retail structured products" to more complex strategies such as multi-strategy hedge funds. Some institutional investors face similar constraints and opportunities. The hedge fund itself benefits by accumulating greater assets to invest which is one measure of success and profitability. An intermediary pricing the puts/insurance policy uses the Gerber Statistic to improve the pricing of its product, capturing more business in the process.

As a second example, an investor may desire to earn a payout if two separate events occur, such as the price of gold rising and the level of interest rates rising. Such an investment may be motivated by either speculation or hedging purposes and is an increasingly common transaction among many types of investors. In this example, a standard regression may prove sub-optimal because relationships may not be linear and/or all available data points may not be arranged in such a way as to properly capture the complexity of such a payout. The relevant data to achieve the investor's goal may not just be the co-movement of the two assets, but also the magnitude of movement and directional co-movement in periods when both assets are appreciating (e.g., a 9×9 matrix with columns defined as "up," "flat," and "down" for the level of interest rates and rows defined as "up," "flat," and "down" for the price of gold). By employing a Gerber Statistic, investors and traders can model and visualize such outcomes focused exclusively on the subset of outcomes where both assets are higher. Investors may care about both the frequency of these outcomes relative to the entire population as well as the magnitude of co-movement within that subset. Traders looking to hedge such a product could focus on implied probability distributions as priced in the options markets. Investors looking to invest in such a product could compare these pricings to historical frequencies and/or their own forward-looking expectations.

In a non-investment application, consider an ice hockey team who wins games by scoring more goals (offense) than they allow (defense). Focusing on defense and a simplified approach, allowing a goal can be defined as a function of (i) the realized skill of defenseman 1 "D1," (ii) the realized skill of defenseman 2 "D2," and (iii) the realized skill of the goaltender "G." Given unlimited resources and available talent, a team could secure the best of each, paying for the best available D1, D2, and G. Doing so would minimize goals allowed, but is not realistic since teams face competition for players, limited budgets for paying players, and league-imposed limits on total salaries. One option for the team is to divide its constrained budget evenly across the three positions securing the best available player for each, where best is defined by some quantitative combination of qualitative scouting reports and increasingly available precise player analytics. Selecting the best available player for each position is analogous to a traditional linear regression approach securing the best possible team across the full universe of outcomes. By using a Gerber Statistic, the team can instead visualize and focus on the subset of most relevant outcome: goals allowed. By testing various combinations of D1, D2, and G, the team may find, for example that hiring an expensive G allows them to hire less expensive D1 and D2, freeing up salary for other positions. Further, the team could threshold this result to their specific circumstances. For example, if they have a strong offense (or face opponents with weak defense), the threshold may be set to minimizing frequency of allowing more than three goals per game. If they have a weaker offense, the threshold may instead be set to two goals per game.

A further non-investment application of the methods and systems discussed herein (Gerber Statistic) exists in the realm of healthcare and specifically for measurement and display of adverse patient outcomes where multiple treatments interact. For example, consider a patient taking two medications to address two separate medical conditions: high cholesterol and a pain in the neck. Condition one is treated by anti-cholesterol medication. Condition two is treated by pain suppressing medication. Where the Gerber Statistic is valuable is in presentation of this information. At present, the interactions between the two medications are assumed to have already been studied and established. More clearly and consistently presenting this information offers three positive effects: (i) improving decision making for patients who are trained in neither medicine nor statistics, (ii) providing more easily understandable metrics to doctors in high-pressure time-sensitive situations, and (iii) motivating further broad and deep studies of interactions creating data for future use. Using the methods and systems described herein, a patient or healthcare provider could visit a website or mobile application which graphically displays the results of existing studies and/or builds data from another source (e.g. patients logging their own experiences into such a website). The patient could select their threshold of adverse outcome: (i) mild discomfort, (ii) severe discomfort, (iii) hospitalization, and (iv) death. The website would then display a 4×4 grid calibrated to display frequency of adverse outcome. The upper left quadrant would be a general population or placebo statistic since adverse outcomes happen even among healthy patients in the absence of medical treatment. The upper right could display frequency of adverse outcomes for patients taking anti-cholesterol medication but not pain medication. The lower left could display adverse frequency of adverse outcomes for patients taking pain medication but not anti-cholesterol medication. The lower right would display adverse outcomes for patients taking both medications with this joint probability outcome reflecting a "thresholded" Gerber Statistic. This could be color coded to make for especially clear interpretation. After reviewing the graphical data presentation, the patient may decide that the interaction risk is sufficiently low to be worth tolerating, that the drugs should be applied in sequence to avoid a negative incremental impact of drug one on drug two (or vice-versa) or that the joint probability of adverse outcome is too high to be tolerable. Further, by calculating the Gerber Statistic for different combinations of drugs at different thresholds of adverse outcome, the patient may make a more informed decision.

Referring now to FIG. 1, an example architecture of a system 100 is shown. At least one user (e.g., a manager, a portfolio manager, trader, or analyst) can communicate with backend operations 170, including a server 120, over a network using a computer 110, such as a personal computer, desktop computer, laptop computer, personal data assistant (PDA), mobile device (e.g., a cellular phone), tablet computer, telephone, smart phone, or any other computing device. The network can be a local area network, wide area network, WI-FI network, or any other type of connection between the server 120 and the computer 110. Although the computer 110 is described as being used by the portfolio manager, it is intended that the label of a portfolio manager is not limited to an entity that has a supervisory role, but rather can include any entity, such as a trader, analyst, or investor, and each entity can have its own computer 110 for interaction with the system 100. The embodiments described herein use the terms investor, trader, manager, portfolio manager, analyst, and user, though it is intended that these functions and roles can be performed by or on behalf of any entity that instructs, uses, or implements the methods and systems described herein. In the example embodiment, the portfolio manager can identify and propose new investments for purposes of portfolio construction.

Figure 2:
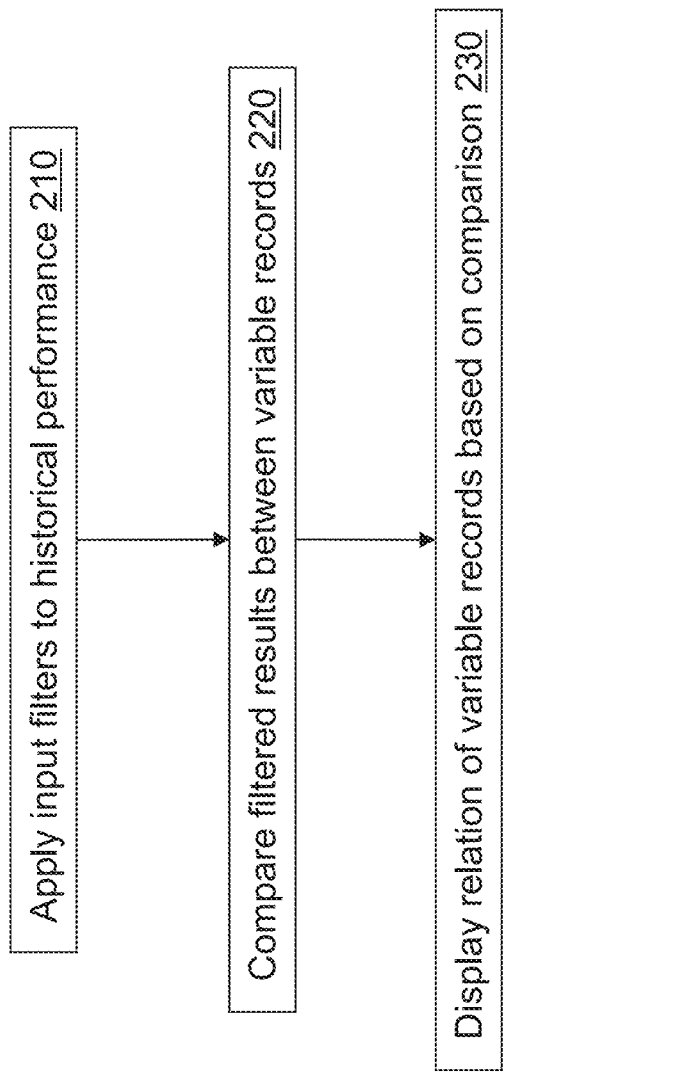
FIG. 2 depicts a method of comparing two variables, according to an embodiment.

The system 100 can also include an entry system 160, which can be a component of the server 120 or a separate, communicatively-coupled device, shown in the example configuration in FIG. 2 as a separate server. The entry system 160 can allow the portfolio manager using computer 110 to submit input data regarding variables as well as inputs controlling backend operations 170. The entry system 160 can also be configured to automatically process input data regarding variables from input data 150. The entry system 160 can also communicate with the server 120 and any other components of the system 100.

At least one manager, such as a chief risk officer or a chief investment manager, can communicate with the server 120 over a network using a computer 140, such as a personal computer, desktop computer, laptop computer, personal data assistant (PDA), mobile device (e.g., a cellular phone), tablet computer, telephone, smart phone, or any other computing device. The network can be a local area network, wide area network, WI-FI network, or any other type of connection between the server 120 and the computer 140. In the example embodiment, the manager can monitor asset allocation and evaluate risk of an investment strategy. The manager may reduce an allocation or impose a different portfolio construction based on an evaluation of diversification and risk.

The server 120 can transmit and receive information from the portfolio manager's computer 110 and the manager's computer 140, and can receive input data 150 from additional sources. Input data 150 can include any data about variables for purposes of measurement and analysis, and other related information. The input data 150 can be imported directly into the server 120, entry system 160 can transmit the input data 150 to the server 120, or computer 110 and computer 140 can transmit the input data 150 to the server 120. In some embodiments, the input data 150 can include real-time updates on stock prices, trade data from a data feed, historical data regarding one or more financial markets, dealer quotes, valuation services, models, good faith estimates or data from other financial data monitoring services.

The server 120 can store information in a database 130. The database 130 can be connected to the server 120 using a network, or alternatively, the server 120 and the database 130 can be integrated as a single computing device. It is also understood that the server 120 and the database 130 can each comprise multiple devices. The database 130 can manage (e.g., store, maintain, delete, search, and retrieve) records regarding variables, analysis regarding the variables, and other related information. In some embodiments, the database 130 can also include records regarding portfolio construction or asset allocation. The database 130 can store time-series data including, but not limited to, data points regarding variables and other external data. The time-series data in the database 130 can be for both current and historical data.

In the example embodiment, a system can compare two or more ideas, concepts, projects, or strategies, which may be implemented into the system as variables. Examples of these ideas, concepts, projects, or strategies can include sport statistics, behavioral statistics, employment statistics, real estate statistics, deal codes, investment strategies, and/or any other measurable objective data. In an embodiment, the systems and methods can be used to assess the relationship between financial indicators (e.g., asset classes, sectors, or markets) implemented into the system as variables. A financial indicator implemented into the system as a variable can be based on, but is not limited to, an asset class, sector, index, market, geographic area, note, corporate bond, municipal bond, stock, treasury stock, debenture, mutual funds, certificate of interest, certificate of deposit, derivative, commodity, currency, trust, put, call, straddle, option, investment in a partnership, investment in a limited liability corporation, fixed income security, equity or debt security, any other type of security or investment or any combination thereof.

Variable records may be stored in the database 130. Each record stored in the database 130 can include data points regarding the variable. The database 130 can store additional information in the record or associated with the record. The additional information can include, but is not limited to, variable type, present variable value, and comments. The database 130 can store variable data points collected during the history of a particular variable, so that a user, such as the portfolio manager or the manager, can query the database 130 to determine, in substantially real-time, the behavior of a variable since it was first entered into the system.

The portfolio manager via computer 110 and the manager via computer 140 can communicate with the server 120 to add, modify, delete, transfer, associate, and update variable records in the database 130. Input data 150 imported into the server 120 can also be used to update or otherwise modify the variable records in the database 130. The portfolio manager via computer 110 or the manager via computer 140 can search the database 130 for substantially real-time variable data points or for historical data. Additionally, the data can be aggregated based on any of the available fields for all date ranges. For example, the database 130 can aggregate all variable records based upon a particular criteria (e.g., all variable records relating to an asset class can be aggregated).

An example process for measuring variables and the relationships between them can be characterized according to (1) a filtering stage, (2) an evaluation stage, and (3) a monitoring stage. It is intended that these stages are merely illustrative. The method is not limited to the order of steps or stages described, and steps or stages may be omitted in some embodiments.

Each of the stages of the system 100 can be implemented by a software module executed by a processor via one or more of the computer 110, server 120, computer 140, or a combination thereof. The first stage can be implemented in a filtering and collecting software module, the second stage can be implemented in an evaluative and performance statistics software module, and the third stage can be implemented in a monitoring software module. These modules can function together with the database 130 to provide data storage, evaluation, and monitoring of variables.

The storage of variable records in the database 130 allows for comparing multiple variables with each other. In this embodiment, calculation of a Gerber statistic may be performed, though it is understood that other types of statistical analysis may be performed in combination with calculation of a Gerber statistic.

The system 100 can present information for display on computer 110 for the portfolio manager or computer 140 for the manager regarding data points associated with a variable record in the database 130. The portfolio manager or the manager can query the system 100 to analyze the Gerber relationship between two or more variables, and the system 100 can output this information for each variable.

The systems and methods described herein are related to those described in the U.S. patent application Ser. Nos. 13/601,310 and 14/015,257, which are incorporated by reference in their entirety. For example, the use of deal code records to monitor investments as taught in the '310 and '257 applications is another implementation of the current framework for measuring relationships between variables. In the context of the systems and methods of the '310 and '257 application, each deal code record can be considered a variable and the investment monitoring system can measures the relationships between those variables.

Figure 9:
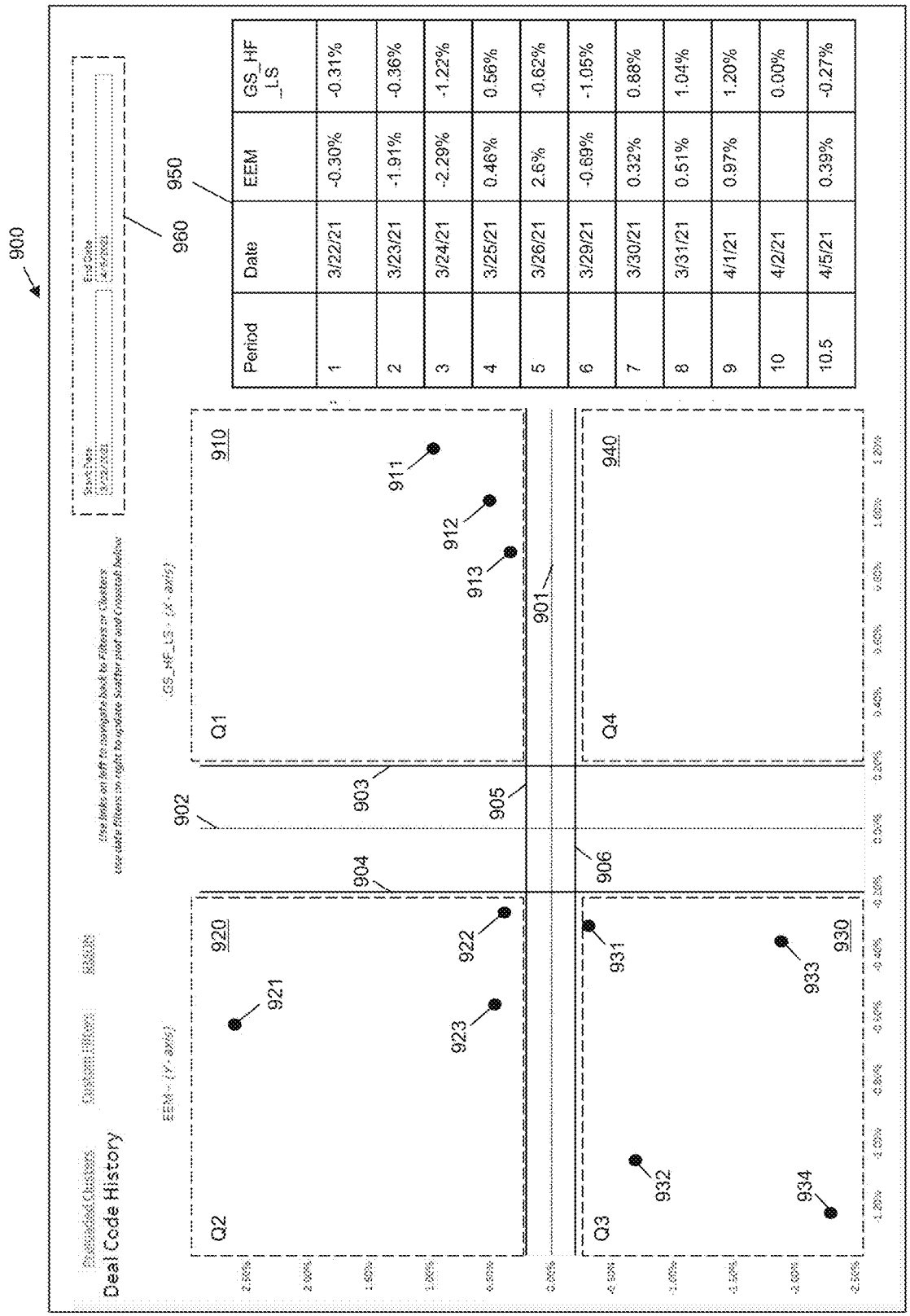

Based on the Gerber relationships between variables, the system can display on a user interface the extent of a relationship between two or more variables, as depicted in FIGS. 8-9. The relationship can be depicted in a format whereby variables moving in the same direction and having a positive relation may be depicted differently (e.g., different size, color, or shape) than those variables moving in a different direction and having a negative relation. In one example, the user interface can present a treemapping of Gerber statistic values, whereby the size of a nested rectangle can be indicative of the extent of a Gerber relationship between two variables, whereby variables represented by larger rectangles are more related to other variables than those variables represented by smaller rectangles. In one alternative, the treemapping of variable relationships can include only those variables having a positive relation or can perform filtering based on other criteria. In another example, the analysis can be presented in a cartographic generalization, whereby a geographic map is generated based on the relationships and elevation can represent an extent of a relationship. In yet another example, the analysis can be presented in a multi-layer Venn diagram, whereby overlapping sections can represent the extent of a relationship between variables. In another example, different assets can be displayed in a spanning tree in accordance with their corresponding Gerber relationships. It is intended that any representation can be displayed, including the use of pictures, symbols, colors, and words, to show an extent of relationship between variables.

In some embodiments, the Gerber relationship between variables (e.g., investments, assets classes, sectors, and markets) can be used to evaluate the co-movement of the variables. A diversity score can be calculated that represents an extent of co-movement between two or more variables. For example, points can be allocated to represent the direction and extent of a Gerber relationship between two or more variables to generate a diversity score. Each variable can be allocated with a point for each instance where the variable has a negative Gerber statistic (i.e., generally moves in opposite directions) with respect to another variable. Variables can also be allocated with fractional points for those negative relations that occur less than a hundred percent of the time (e.g., for a relation of −20%, a 0.2 can be awarded). Likewise, a negative point or fraction thereof can be applied each time a variable has a positive relation (i.e., generally moves in the same direction) with respect to another variable. The total points for a variable can be considered a diversity score. In some configurations and embodiments a higher diversity score is more favorable for some variables (e.g., investments).

The Gerber relationship can be used in the context of portfolio construction. In constructing a portfolio, an investor determines how to allocate capital between various assets (e.g., equities, fixed income securities, cash, real estate, currency, alternatives, commodities, collectibles, and derivatives) based upon risk tolerance or minimum rate of return. A portfolio with a high diversification of assets can subject the investor to lower risk for the same level of expected return, and the Gerber relationship can be used to measure the diversification of a portfolio.

An established method for portfolio construction according to mean-variance optimization involves analyzing the risk of potential investments using expected return, expected variance, and expected covariance. This method is described in further detail in "Portfolio Selection" and "Portfolio Selection: Efficient Diversification of Investments," incorporated herein by reference in their entirety. The portfolio can then be optimized based on risk tolerance or return requirements. When applying this method, the Gerber relationship can be used in place of correlation to provide a more accurate measure of expected covariance than the conventional measure of expected covariance and/or expected semi-variance.

In allocating capital among various assets with different levels of risk, an investor might focus on achieving the best possible rate of return for the portfolio without exceeding a risk limit, which is affected by the diversification of the individual assets in the portfolio. As described herein, risk can be described as an estimated probability of a return below a negative threshold. In other words, the investor typically desires the best possible return for a given risk level. In some scenarios, an investor may seek the minimum amount of risk based on a given return target. The risk of a portfolio's return is related to the variance of its return, and so a goal of portfolio construction is to create a portfolio with a high return and a minimized variance. But the variance of a portfolio also depends on the covariances between the individual investments. Accordingly, optimal portfolio construction accounts for the co-movement of investments.

Conventional portfolio construction methods attempt to determine a risk-adjusted return of a portfolio of investments using each investment's expected return and covariance with the other investments in the portfolio. Traditionally, covariance of two investments is based on correlation and may be calculated as follows:

$$\text{Cov}(R_X, R_Y) = \sigma_X \sigma_Y \rho_{XY}$$

Where $R_X$ denotes a return of the first investment, $R_Y$ denotes a return of the second investment, $\sigma_X$ denotes a standard deviation of the return of the first investment, $\sigma_Y$ denotes a standard deviation of the return of the second investment, and $\rho_{XY}$ denotes a correlation value between the first and second investments. A correlation value must always be a number between −1 and 1, whereby a correlation of 1 indicates that the investments move perfectly together, a correlation of 0 indicates that the investments move independently from each other, and a correlation of −1 indicates that the investments move perfectly in opposite directions. Conventional methods use this covariance formula to calculate the standard deviation of the returns from a multi-investment portfolio, whereby the standard deviation may represent an indicator of risk for the portfolio.

The system can use Gerber relationships to calculate covariance of investments instead of the conventional methods that rely on correlation. In some embodiments, the system can use Gerber relationships to calculate a covariance matrix comparing each possible pair of investments in a portfolio. A Gerber statistic can provide a co-movement measure in the same units and range as a conventional correlation calculation (e.g., a number between −1 and 1). As a result, the Gerber statistic can easily replace the conventional correlation measurement when calculating the covariance of a portfolio. Using the Gerber statistic as a replacement for correlation, the same expected variances may be used to calculate covariances or semi-variances, which can then be used with the same expected returns to identify a mean-variance optimal allocation for each investment in the portfolio. The resulting portfolio construction or optimization will produce improved results because of the previously discussed advantages that measuring the Gerber statistic has over conventional correlation.

An investor can use a computer system, such as system 100, to calculate the expected return of a proposed portfolio or an existing portfolio. The investor can input the portfolio's investments into the system, which can access historical data about the investments and calculate the necessary Gerber statistic. The computer system can assess the Gerber statistic and display a figure, number, scale, or other graphic to the investor about the risk in the investments. Based upon an input of a capital amount to invest, the systems can determine how to allocate the capital based upon the investor's acceptable level of risk or target returns. For example, when attempting to maximize returns of a portfolio for a given level of risk, the computer system can vary the weightings of different investments to find the best possible expected returns without exceeding the given level of risk. The system may then allocate capital based upon the weighting of those investments to maintain the appropriate risk-reward levels. In one embodiment, the investor can adjust a level of acceptable risk, and the computer system can suggest a new weighting of the investments to maximize returns for that risk level. Upon a confirmation by the investor, the system can automatically allocate the capital accordingly.

As described herein, risk may refer to an estimated probability of a return below a negative threshold. Furthermore, different end users may have different risk tolerances and/or risk preferences. For instance, a long-term investor may view a −20% return worse than a +20% return because the latter takes greater returns to recover from. Therefore, the methods and systems described herein can be used for investment strategies with stop losses, managing assets where their "downside volatility" is believed to be more costly than "upside volatility," hedging of fixed strike exotic options, issuance of structured products with capital floors where the hedger takes residual gap risk, or potential extensions into risk allocation and portfolio sizing using other protocols, such as Kelly Criterion.

The Gerber statistic is a robust measure of correlation between data points representing different assets. The Gerber statistic allows a processor to analyze (e.g., count) the proportion of simultaneous co-movements in series of data points when their amplitudes exceed data-dependent thresholds. The Gerber statistic described herein is unlike conventional methods, such as the Kendall's Tau or the standard Pearson correlation that are sensitive to outliers or the Spearman correlation that relies on ranking observations.

As will be described herein, the one or more versions of the Gerber statistic are neither affected by extremely large or extremely small movements. Therefore, the Gerber statistic is suited to analyze financial time series data since these time series data can be noisy, include fluctuations, and/or exhibit extreme movements (e.g., sudden spikes or asset price re-basing on material incremental information). A computer server, such as the computer system 100 depicted in FIG. 2, can utilize the Gerber statistic to calculate an estimate of a covariance matrix that is suitable for portfolio optimization.

Portfolio construction and optimization, such as the Markowitz method described herein, relies heavily on the availability of the matrix of covariances between securities' returns. In some configurations, the historic covariance matrix is used as an estimate for future covariance matrix. Various models have been used to ease the computational burden and to improve statistical properties of covariance matrix estimates. However, many conventional methods suffer from a technical shortcoming when estimating covariance matrices. For instance, conventional methods use product-moment-based estimates that are inherently inefficient if the underlying distribution is prone to containing extreme measurements or outliers.

These shortcomings cause incorrect results or require heavy computational resources when applied to financial data. For instance, financial time series data are particularly noisy, and a computer analyzing the financial time series data using conventional methods can easily misinterpret the noise as information. One consequence, for example, is that the correlation matrix estimates (even ones constructed using robust techniques) often have non-zero entries corresponding to series that in fact have no meaningful correlation. The correlation estimates can also be distorted if the series contains extremely large (positive or negative) observations.

The Gerber statistic versions described herein provide a robust method for computing a co-movement measure that ignore fluctuations below a certain threshold, while simultaneously limiting the effects of extreme movements. For instance, $r_{tk}$ may represent the return of security k at time t (e.g., for k=1, K securities and t=1, ..., T time periods). For every pair (i, j) of assets for each time t, the Gerber statistic may convert each return observation pair $(r_{ti}, R_{tj})$ to a joint observation $m_{ij}(t)$ defined using the equation depicted below:

$$m_{ij}(t) = \begin{cases} +1 & \text{if } r_{ti} \geq +H_i \text{ and } r_{tj} \geq +H_j, \\ +1 & \text{if } r_{ti} \leq -H_i \text{ and } r_{tj} \leq -H_j, \\ -1 & \text{if } r_{ti} \geq +H_i \text{ and } r_{tj} \leq -H_j, \\ -1 & \text{if } r_{ti} \leq -H_i \text{ and } r_{tj} \geq +H_j, \\ 0 & \text{otherwise,} \end{cases}$$

In the depicted equation, $H_k$ represents a threshold for security k. The joint observation $m_{ij}(t)$ is therefore set to +1 if the series i and j simultaneously satisfy their thresholds in the same direction at time t; to −1 if they satisfy their thresholds in opposite directions at time t, or to zero if at least one of the series does not satisfy its threshold at time t.

A pair for which both components satisfy their thresholds while moving in the same direction can also be referred to as a concordant pair (e.g., co-movement), and one whose components satisfy their thresholds while moving in opposite directions can be referred to as a discordant pair.

In a configuration, the system utilizing the Gerber statistic may set the threshold $H_k$ for security k to be:

$$H_k = c\sigma_k$$

Where c is some fraction (e.g., ½) and $\sigma_k$ is the sample standard deviation of the return of security k. The system may also consider a window of time over which the standard of deviation is calculated (e.g., a period for each individual return). For instance, the standard deviation value for an asset calculated for 1 day of minute-by-minute value changes in USDJPY may differ from the standard deviation of the same asset for 10 years of monthly returns. In alternative configurations, more robust measures than standard deviation can be used for the threshold computation. The Gerber statistic for a pair of assets can then be defined as:

$$g_{ij} = \frac{\sum_{t=1}^{T} m_{ij}(t)}{\sum_{t=1}^{T} |m_{ij}(t)|} \quad (1)$$

Letting $n^c_{ij}$ be the number of concordant pairs for series i and j, and letting $n^d_{ij}$ be the number of discordant pairs, it can be shown that Equation (1) is equivalent to:

$$g_{ij} = \frac{n^c_{ij} - n^d_{ij}}{n^c_{ij} + n^d_{ij}}.$$

Since this statistic relies on counts of the number of simultaneous satisfaction of thresholds (and not on the extent to which the thresholds are satisfied), it may be less sensitive to extreme movements that distort product-moment-based measures. At the same time, since a series must exceed its threshold before it becomes a candidate to be counted, the measure is also less sensitive to small movements that may simply be noise.

To generate the desired matrix, the system may define $R \in R^{T \times K}$ as the return matrix having $r_{tk}$ in its $t^{th}$ row and $k^{th}$ column. The system may also define U as a matrix with the same size as R having entries $u_{ij}$ such that:

$$u_{ij} = \begin{cases} 1 & \text{if } r_{tj} \geq +H_j, \\ 0 & \text{otherwise.} \end{cases}$$

With these definitions, the matrix of the number of samples that exceed the upper threshold will become $N^{uu}=U^t U$. In this example, the ij element $n^{UU}_{ij}$ of $N^{UU}$ is the number of samples for which both time series i exceeds the upper threshold and for which time series j simultaneously exceeds the upper threshold.

Similarly, the system may define D as the matrix with the same size as R having entries $d_{ij}$ such that:

$$d_{ij} = \begin{cases} 1 & \text{if } r_{tj} \geq -H_j, \\ 0 & \text{otherwise.} \end{cases}$$

With this definition, the matrix of the number of samples that are under the lower threshold will become $N^{DD}=D^t D$. As can be inferred, this method may utilize the useful property that ij element $n^{DD}_{ij}$ of $N^{DD}$ is the number of samples for which both time series i is below the lower threshold and for which time series j is simultaneously below the lower threshold. Accordingly, the matrix containing the number of concordant pairs becomes:

$$N_{CONC}=N^{UU}+N^{DD}=U^T U+D^T D.$$

Furthermore, the matrix containing the numbers of discordant pairs becomes:

$$N_{DISC}=U^T D+D^T U.$$

The system may then generate the Gerber matrix "G" (e.g., the matrix that contains $g_{ij}$ in its $i^{th}$ row and $j^{th}$ column) in the equivalent matrix form:

$$G=(N_{CONC}-N_{DISC})\oslash(N_{CONC}+N_{DISC})$$

Where the symbol Ø represents the Hadamard (element-wise) division. To simplify the description of various versions of the Gerber statistic, it is useful to consider the following graphical representation for the relationship between two securities:

| | | |
|---|---|---|
| UD | UN | UU |
| ND | NN | NU |
| DD | DN | DU |

As depicted above, the rows represent categorizations of security i. The columns represent categorizations of security j. The boundaries between the rows and the columns represent the chosen thresholds. The letter U represents the case in which a security's return lies above the upper threshold (e.g., is up). The letter N represents the case in which a security's return lies between the upper and lower thresholds (e.g., is neutral). The letter D represents the case in which a security's return lies below the lower threshold (e.g., is down). In a non-limiting example, if at time t, the return of security i is above the upper threshold, this observation lies in the top row. If, at the same time t, the return of security j lies between the two thresholds, this observation lies in the middle column. Therefore, this observation lies in the UN region.

When executed iteratively and over a period of time (e.g., t=1, . . . , T), there will be observations scattered over the nine regions. Let $n^{pq}_{ij}$ be the number of observations for which the returns of securities i and j lie in regions p and q. Respectively, for p, q∈{U, N, D}. With this notation, the system can obtain another equivalent expression for the Gerber statistic as:

$$g_{ij} = \frac{n^{UU}_{ij} + n^{DD}_{ij} - n^{UD}_{ij} - n^{DU}_{ij}}{n^{UU}_{ij} + n^{DD}_{ij} + n^{UD}_{ij} + n^{DU}_{ij}}.$$

The correlation matrix constructed from the Gerber statistic described in the patent applications to which this application claims priority and as defined in Equation (1) may sometimes lead to results that are not positive semi-definite (PSD). If the system encounters a covariance matrix that is not PSD, then the system may construct a portfolio indicating a negative risk. As a result, the system may indicate an arbitrarily large position based on the mistaken belief that risk tolerances will not be breached, which may lead to erroneous results.

As a result, the system may also utilize a few alternative methods. In a first non-limiting example, the system may use:

$$g^{(1)}_{ij} = \frac{\sum_{t=1}^{T} m_{ij}(t)}{T - n^{NN}_{ij}}.$$

This can be written in terms of the alternative notation as:

$$g^{(1)}_{ij} = \frac{n^{UU}_{ij} + n^{DD}_{ij} - n^{UD}_{ij} - n^{DU}_{ij}}{T - n^{NN}_{ij}}, \quad (2)$$

The above equation (Equation (2)) is also referred to herein as Gerber Statistic (GS1), which is a different version of the Gerber statistic (GS). Another version, Gerber Statistic 2 (GS2), can be defined as:

$$g_{ij}^{(2)} = \frac{n_{ij}^{UU} + n_{ij}^{DD} - n_{ij}^{UD} - n_{ij}^{DU}}{\sqrt{n_{ij}^{(A)} n_{ij}^{(B)}}} \qquad (3)$$

where the $n^{(A)}_{ij}$ and $n^{(B)}_{ij}$ in the denominator are defined as:

$$n_{ij}^{(A)} = n_{ij}^{UU} + n_{ij}^{UN} + n_{ij}^{UD} + n_{ij}^{DU} + n_{ij}^{DN} + n_{ij}^{DD},$$

$$n_{ij}^{(B)} = n_{ij}^{UU} + n_{ij}^{NU} + n_{ij}^{DU} + n_{ij}^{UD} + n_{ij}^{ND} + n_{ij}^{DD}.$$

Let $Q = N_{CONC} - N_{DISC}$; and let $q = $ the $\sqrt{\text{Diag}(Q)}$ to be the vector of square roots of the diagonal element of Q (which are all positive). Therefore, it can be shown that GS2 can be written in the matrix form:

$$G^{(2)} = (N_{CONC} - N_{DISC}) \oslash (qq^T)$$

Written differently (letting $J = J^T$) be the diagonal matrix with the inverse of the $i^{th}$ element of q in its $i^{th}$ diagonal position would lead to:

$$G^{(2)} = J^T (N_{CONC} - N_{DISC}) J.$$

Portfolio optimizers may require the covariance matrix of securities' returns to be positive semidefinite. The methods and systems described herein (e.g., Gerber matrix) can be used as a robust version of the correlation matrix from which a corresponding robust version of the covariance matrix can be constructed. The system may use this version of the covariance matrix in a portfolio optimizer. Therefore, the system may require the Gerber matrix to be positive semidefinite.

The Gerber matrix can be viewed as a matrix ratio whose numerator matrix is $Q = N_{CONC} - N_{DISC}$ and whose denominator matrix depends on the particular alternative chosen. If the numerator matrix is positive semidefinite, the Gerber matrix will be positive semidefinite if the denominator is positive semidefinite. Therefore, to establish that the given alternatives are positive semidefinite the following proves that the numerator matrix is positive semidefinite.

From the definitions of $N_{CONC}$ and $N_{DISC}$, the numerator matrix can be written in the following squared form:

$$Q = N_{CONC} - N_{DISC}$$
$$= U^T U + D^T D - U^T D - D^T U$$
$$= (U - D)^T (U - D)$$

Therefore, for arbitrary but non-zero X:

$$x^T Q x = x^T (U - D)^T (U - D) x = u^T u \geq 0.$$

As a result, the numerator matrix will be positive semidefinite. For certain cases, it is possible to extend this analysis to show that the Gerber matrix itself is positive semidefinite. For example, in the second alternative form:

$$x^T G^{(2)} x = x^T J^T H J x$$
$$= x^T J^T (U - D)^T (U - D) J x = u^T u \geq 0.$$

GS1 also produces positive semidefinite correlation matrices. This can be proven by noting that the numerator matrix Q is positive semidefinite as shown above, and the Hadamard denominator matrix is a positive matrix itself.

The system may also use an optimal shrinkage estimator protocol. The system may use the methods described herein to calculate covariance between a pair of assets. For instance, in a non-limiting example of a sample covariance matrix method described below, let $r_{i,t}$ denote the historical return for asset i at time period t and the average return over the time ranging from t=1 to t=T to be $\bar{r}_i$ $$\bar{r}_i = \frac{1}{T} \sum_{t=1}^{T} r_{i,t}.$$

Then the sample covariance between a pair of assets can be estimated via:

$$Cov(r_i, r_j) = \frac{1}{T-1} \sum_{t=1}^{T} (r_{i,t} - \bar{r}_i)(r_{j,t} - \bar{r}_i) \stackrel{def}{=} \hat{\sigma}_{i,j}.$$

The historical covariance matrix for N assets can be specified via evaluating the above equation for pairs of i, j assets or:

$$\sum\nolimits_{HC} = \begin{bmatrix} \hat{\sigma}_{11} & \hat{\sigma}_{12} & \cdots & \hat{\sigma}_{1N} \\ \hat{\sigma}_{211} & \hat{\sigma}_{22} & \cdots & \hat{\sigma}_{2N} \\ \vdots & \vdots & \ddots & \vdots \\ \hat{\sigma}_{N1} & \hat{\sigma}_{N2} & \cdots & \hat{\sigma}_{NN} \end{bmatrix}.$$

The estimated covariance matrices can then be obtained from the historical correlation matrix:

$$\hat{\Sigma}_{HC} = \text{diag}(\hat{\sigma}) \hat{C}_{HC} \text{diag}(\hat{\sigma})$$

Where σ is an N×1 vector of sample standard deviation of the historical asset returns, expected future returns, or expected future returns as priced by various derivative markets and $C_{HC}$ is the sample correlation matric of the historical asset returns. In another non-limiting example, such as the single-index method described below, the system may use a Sharpe's single-index model. The single-index model assumes the return of the an individual stock i is related to the return of a stock market index m, as follows:

$$r_i = \alpha_i + \beta_i r_m + \epsilon_i$$

Where $\alpha_i$ is the excess return that is independent of the market changes, $\beta_i$ is a measurement of the sensitivity of asset i's return to the market index return, and $\epsilon_i$ is the residual term with $\mathbb{E}[\epsilon_i] = 0$. The single-index covariance estimator assumes that the residual terms between assets are independent e.g., $\epsilon_i$ and $\epsilon_j$ are independent for i and j pairs such that:

$$\mathbb{E}[\epsilon_i \epsilon_j] = 0, \forall i,j (i \neq j).$$

Given this assumption, one can show the variance of an asset i is:

$$\sigma_i^2 = \underbrace{\beta_i^2 \sigma_m^2}_{\text{Systematic risk}} + \underbrace{\sigma_{\epsilon_i}^2}_{\text{Asset specific risk}},$$

Where $\sigma_m^2$ is the variance of the market returns and $\sigma_{\epsilon i}^2$ is the variance of $\epsilon_i$. The covariance between two assets i and j is given by:

$$\sigma_{ij} = \beta_i \beta_j \sigma_m^2 \forall i,k,i \neq j,$$

and the estimated covariance matrix implied by such model is:

$$\hat{\Sigma}_{SI} = \hat{\beta}\hat{\beta}^T \sigma_m^2 + \text{diag}(\hat{\sigma}_\epsilon^2),$$

Where $\beta = [\beta_1 \ldots \beta_N]^T$ denotes a vector of estimated betas and the following represent a vector of estimated variances of residual terms for each asset:

$$\hat{\sigma}_\epsilon^2 = [\hat{\sigma}_{\epsilon 1}^2, \ldots, \hat{\sigma}_{\epsilon N}^2]$$

In some configurations, the system may utilize a shrinkage method that achieves a balance between the sample covariance and single-index methods described herein. For instance, the system may use a shrinkage parameter of:

$$a \in [0,1]$$

This shrinkage parameter may balance between the two approaches discussed herein, as depicted below:

$$\Sigma_{SM} = a\Sigma_{SI} + (1-a)\Sigma_{HC}.$$

The system may find the optimal shrinkage parameter a via minimizing the Frobenius norm between the asymptomatically true covariance matrix and shrinkage estimate as depicted below:

$$a^* = \underset{a}{\arg\min} \left\| a\sum\nolimits_{SI} + (1-a)\sum\nolimits_{HC} - \sum \right\|_F^2$$

Figure 5B:
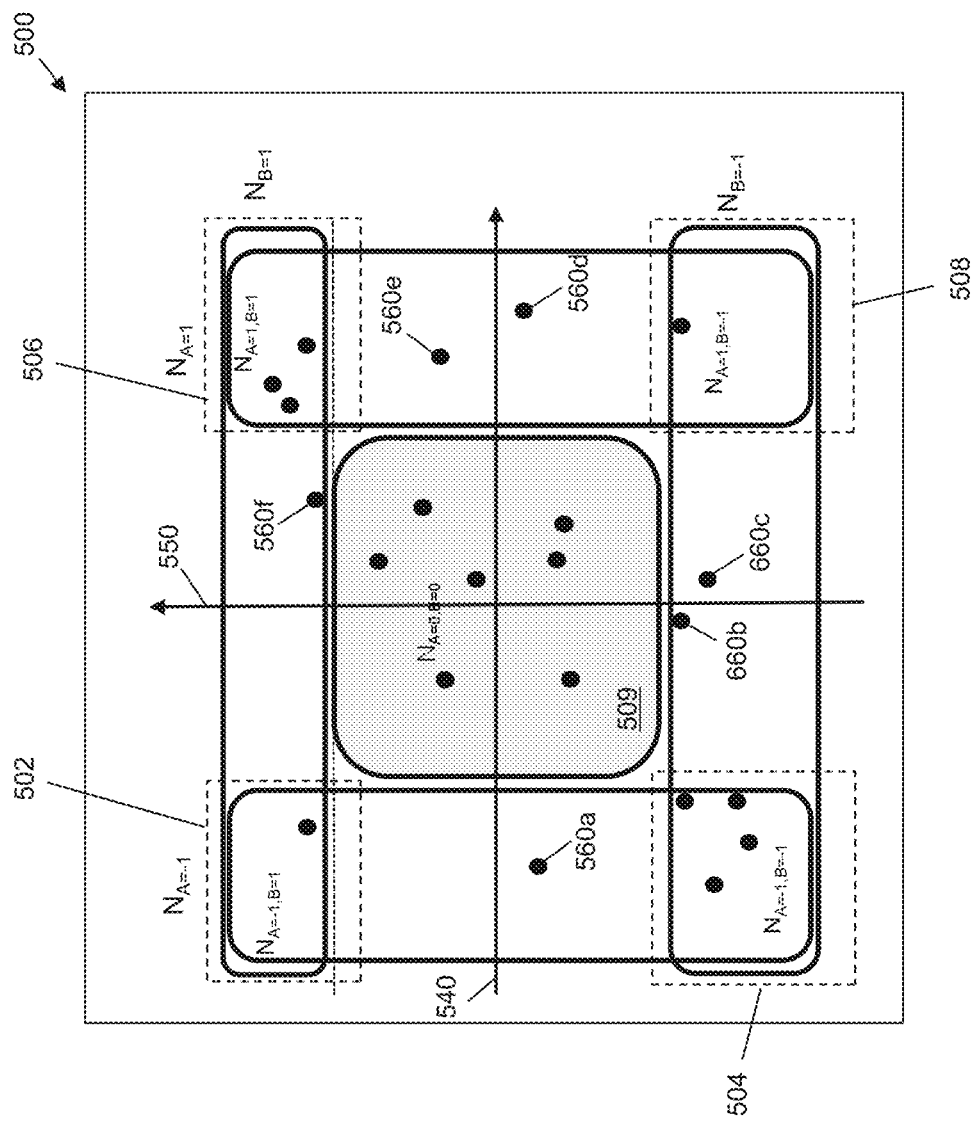

Referring now to FIGS. 5A and B, different versions of the Gerber statistic (GS, GS1 and GS2) are depicted by equations 510-530. These equations correspond to analyzing data represented by the data points depicted within the graph 500 (FIG. 5B). In FIG. 5A, the Gerber statistic (GS) is represented by the equation 510, which indicates which data points depicted in FIG. 5B are used to calculate the Gerber statistic. GS1 is represented by equation 520, which indicates which data points depicted in FIG. 5B are used by GS1. GS2 is represented by equation 530, which indicates which data points depicted in FIG. 5B are used by GS2.

In the embodiment depicted in FIGS. 5A and B, different versions of the Gerber statistic are used to analyze data associated with two assets (A and B). Each data point within the graph 500 (depicted in FIG. 5B) may represent a transformed (e.g., discretized or normalized) value associated with each asset. For instance, data points reflecting stock prices for different times may be transformed into a range of −1 to 1. These data points are shown in the graph 500 and arranged based on their values with respect to the axis 540 and 550. As depicted, the equation 510 accounts for a difference between the data points within the boxes 506 and 504 compared with data points within the boxes 502 and 508. In the denominator, the equation 510 accounts for a difference between the total number of data points and the data points outside the boxes 502, 504, 506, and 508 (e.g., data points within the box 509).

A difference between GS and GS1 (represented by the equation 520) is that while the numerator of both equations are the same, the denominator of the equation 520 accounts for more data points. Specifically, the equation 520 accounts for all the data points excluding the data points within the box 509 (where both asset A and B are below the threshold). Effectively, the equation 520 also accounts for data points 560a-f, which are not considered in the equation 510. This modification allows for the system to account for more data points while maintaining PSD results.

GS2 (represented by the equation 530) shares the same numerator as the other equations. The equation 530 includes the square roots of the data points where asset A satisfies the threshold (e.g., every time that a data point for asset A is above the threshold on either sides, whether is it negative or positive) multiplied by the square root of all data points where asset B satisfies a threshold (e.g., every time that asset B is above the threshold on either sides, whether is it negative or positive). This modification allows for the system to account for more data points while maintaining PSD results.

Some aspects of the present disclosure discuss a 2×2 matrix to be analyzed (e.g., a matrix that analyzed data points and determines whether they are above or below a threshold). However, it is understood that the methods and systems described herein can apply to other number of variables too. For instance, the methods and systems described herein can use a 3×3 matrix where each variable is bucketed into the following three categories: above-threshold (e.g., box 502), below-threshold (e.g., box 504), and between-threshold (box 509). Using this data a server can identify many insights. For instance, data points that are in between thresholds may describe how infrequently the assets move sufficiently and may also indicate outcomes of smaller "drift" moves. In some embodiments, a graphical user interface may display the data points on the end-user's device, such as depicted in FIG. 9 where the data points of all three categories are displayed.

Classical portfolio construction optimization methods generally rely upon covariance matrix methods. Covariance of assets can be mathematically defined as the multiplication of the standard deviation of each asset by the correlation of the two asset returns. Using the methods discussed herein, the correlation, as used in the classical portfolio construction optimization methods, can be replaced by the Gerber relationship calculated using one or more versions of the Gerber statistic because the Gerber statistic is more efficient and accurate measurement of co-movement between two assets. Therefore, an optimizer can change covariance with Gerber statistic (any of the versions) to achieve better results. Using the methods and systems described herein, performance of an asset can be monitored, such that investments can be managed while limiting the risk (e.g., preventing or minimizing the probability of the return from going below a pre-determined threshold). Therefore, utilizing the Gerber statistic will improve classical portfolio optimization methods by maximizing return and minimizing drawdown.

Moreover, the methods discussed herein also provide a semi-variance relationship between the analyzed data points. Semi-variance is defined as the expected squared deviation from a threshold, d, usually chosen as either 0 or the mean value for time-series data to be analyzed, as depicted in the following equation:

$$S = E\{(r-d)\_^2\}$$

Where E is the expectation operator, r is the portfolio return, and the negative part function is:

$$x_- = \begin{cases} x & \text{if } x < 0 \\ 0 & \text{if } x \geq 0 \end{cases}$$

In the covariance methods, the upside risk and the downside risk are mathematically defined the same. For instance, the risk of an asset increasing or decreasing by 2% is weighted equally by covariance optimization methods. In contrast, a semi-variance method weights these risk differently. For instance, a 2% chance of an asset increasing may be deemed more important than a 2% chance of the same asset decreasing (or vice versa).

The semi-variance method discussed herein may yield better results because the return distribution for financial time-series data is typically not symmetrical and/or because investor preferences may differ. The Gerber statistic can be used in conjunction with optimizers to construct and optimize portfolios.

In general, the objective of the mean-variance portfolio problem is to choose a portfolio x so as to:

minimize $V = x^T C x$ subject to $\mu^T x = E$, $Ax = b$, $x \geq 0$, for all $E \in [E_{min}, E_{max}]$.

Using the methods described herein, the system may minimize semi-variance (or alternatively, the variance below a predetermined value). Therefore, instead of minimizing V in the problem above, the system may minimize S in the below equation:

$$S = \mathbb{E}[(r_p - d)^2_-] \quad (1)$$

where $r_p$ is the portfolio return, d is a downside threshold, the symbol E represents the expectation operator, and the negative sign in the subscript denotes the absolute value of the negative part, that is:

$$x_- = \begin{cases} |x| & \text{if } x < 0, \\ 0 & \text{if } x \geq 0. \end{cases}$$

To perform downside optimization of S, in the above equation (1), the system may use:

$$S = \frac{1}{T} \sum_{t=1}^{T} (r_p(t) - d)^2_-$$

where $r_p(t)$ is the return of the portfolio at time t.

When using a semi-variance method, the system may use the portfolio's expected return in place of d (in equation 1). Therefore, the downside optimization is replaced by a semi-variance optimization. Specifically, the system may define R as the T×n matrix of historical security returns:

$$R = \begin{bmatrix} r_{11} & r_{12} & \cdots & r_{1n} \\ r_{21} & r_{22} & \cdots & r_{2n} \\ \vdots & \vdots & \ddots & \vdots \\ r_{T1} & r_{T2} & \cdots & r_{Tn} \end{bmatrix}$$

That is, the element in row t and column j is the return of the $j^{th}$ security in period t. The securities' returns in excess of their means can be defined as:

$R - \iota\mu^T$, where $\mu$ is the n-vector of mean returns and $\iota$ is an appropriately dimensioned vector of ones. Therefore, the time-series of portfolio returns below the mean is:

$[(R - \iota\mu^T)x]_-$,

Accordingly, the portfolio's semi-variance can be written as:

$$S = \frac{1}{T}[(R - \iota\mu^T)x]_-^T [(R - \iota\mu^T)x]_- . \quad (2)$$

whereby defining the matrix as:

$$B = \frac{1}{\sqrt{T}}[R - \iota\mu^T]$$

and the two variables y and z are defined as y=Bx and:

$z = y_-$.

With these definitions, the semi-variance defined in equation (2) becomes $S = z^t z$. The system can then reformulate the semi-variance problem as a minimization of a simple square subject to a new set of constraints, as shown below:

minimize $S = z^T z$ subject to $\mu^T x = E$, $Ax = b$, $Bx - y + z = 0$, $x, y, z \geq 0$, for all $E \in [E_{min}, E_{max}]$, The Gerber relationship can be calculated based on the coordinated movements of multiple variables using one or more versions of the Gerber statistic described herein (e.g., GS, GS1, and/or GS2). Referring to FIG. 2, this analysis can be performed by a data processing system (e.g., the system depicted in FIG. 1), in step 210. In one embodiment, an input filter may specify both the number of observation periods and a threshold value that the measured movement must exceed to be considered as a qualifying event. For example, the analysis may consider the instances over the last 25 days where both variables moved over a predefined amount (e.g., 1% of the value) in the same day. For each of the variable records in the analysis, the system 100 can then compare the filtered results of each variable record to each of the other variable records, in step 220. The results, which may indicate the frequency of similar behavior, can be used to determine the uniqueness, with regard to performance, of each variable when compared to the other individual variables in the analysis. The analysis of step 230 can be performed by computer 110, computer 140, server 120, or any combination thereof. The results can be displayed, in step 230. For example, computer 110 or computer 140 can present the comparison of variables.

In some situations, groups of variables may exhibit related performance over time. For example, a collection of variables associated with one characteristic (e.g., various investments associated with the same asset class) may exhibit a pattern of performance when compared to a collection of variables associated with a second characteristic (e.g., investments associated with a different asset class). Accordingly, the systems and methods described herein can measure the Gerber relationships between a first group of variables and a second group of variables.

The methods and systems described herein can be used to construct a customized portfolio and dynamically reallocate assets to be invested in an automated fashion. The system may provide an electronic platform in which a robotic advisor (e.g., virtual advisor or robo-advisor) can ingest investment preferences, goals, list of investment vehicles, and other relevant information from a user (e.g., portfolio manager, investor, or any other party interested in constructing a portfolio). The robo-advisor can construct a portfolio using the one or more versions of the Gerber statistic discussed herein applied via one or more optimization methods that utilize the user's inputted preferences to maximize returns.

The methods and systems described herein can be used to create a return-linked structured product. In a non-limiting example, an investor may have a defined capital pool of $100. Such an amount may prevent the investor from "shorting" or "leveraging" any asset without an exhaustive and impractical credit analysis. As a result, the inventor may have three choices: (i) a long-only portfolio with zero leverage (which may not be optimal and may incentivize buying higher-leverage assets within the portfolio even if those assets offer inferior risk/reward); (ii) buy puts or calls to achieve defined-loss leverage and shorts (this strategy would introduce theta decay and added complexity which may not be optimal); or (iii) buy a structured product for $100 where a counterparty executes a strategy on their behalf. Assuming that the strategy could possibly go "negative" and incur losses beyond the initial $100, the risk to the counterparty may be embedded in the price of the product, which is undesirable to the investor.

Using the methods and systems described herein, the investor's assets can be managed better in pricing catastrophic capital destruction cases than other methods of portfolio construction. Specifically, using the Gerber statistic discussed herein, counterparties (e.g., banks) could price the above-described risk more efficiently. As a result, the investor could get access to a broader range of investments/strategies at a more reasonable price.

Figure 3:
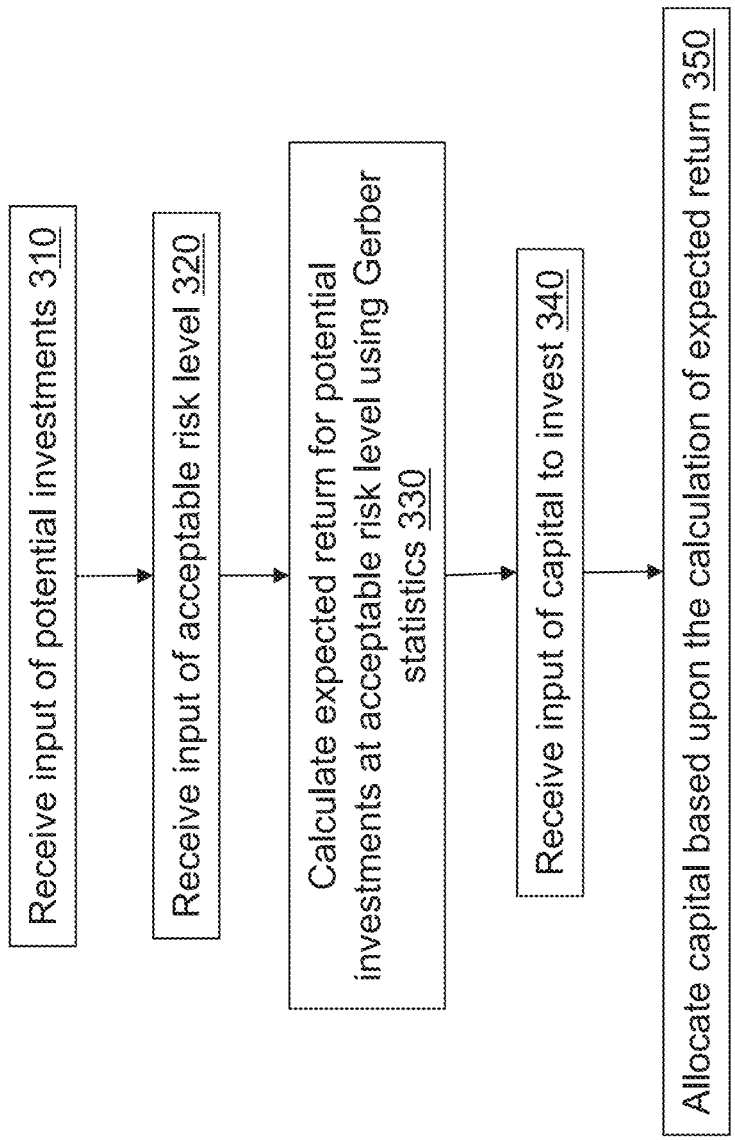
FIG. 3 depicts a method of portfolio construction, according to an embodiment.

In a method of portfolio construction, as shown in FIG. 3, a computer system (e.g., system 100 shown in FIG. 1) can receive an input of potential investments from a user or another computer (e.g., interconnected computers/servers automatically constructing a portfolio), in step 310. The input can include an identification of different asset classes, sectors, markets, investment strategies, or particular investment vehicles. The system can also receive an acceptable level of risk, in step 320. The acceptable level of risk can be determined by the user, or the system may use a default level. Based upon the identified investments and the level of risk, the computer system can calculate an expected return for the potential investments using one or more versions of the Gerber statistic, in step 330. The system may calculate various weightings of the investments to determine how to allocate capital between these investments to achieve the maximum level of return while satisfying the acceptable rate of risk. The system may evaluate a series of scenarios in which different amount of capital is allocated to different assets to identify which scenario yields the best return. The system may use multiple different expected return assumptions weighted by some probability of each expected return set being realized over the investment horizon. The system may then receive an input of an amount of capital, in step 340. The system can allocate the capital to the inputted investments based upon the calculations, in step 350.

In a non-limiting example, a user accesses an electronic platform (e.g., website) hosted or otherwise functionally controlled by the system. The user may use various input elements to enter a list of investments, assets, deal codes, investment strategies, and/or asset classes (e.g., cash, stocks, and gold). The user may also indicate a risk tolerance (e.g., low, medium, or high risk indicating aggressive investing). The system may use one or more versions of the Gerber statistic to construct a portfolio for the user. For example, the system may display an explanation that because the user has chosen a conservative (low risk) investment strategy, the system has optimized a unique portfolio for the user that includes 40% cash, 30% S&P investments, 20% gold, and 10% aggressive ETFs. The system may also indicate a percentage of capital allocation for different S&P stocks. For instance, the system may recommend that the user allocates half of the capital to be allocated the S&P stocks (15% of the total investment) into a particular stock and divide the other half into five different stocks.

The electronic platform displaying the recommendations may include interactive elements, such that the user can override/revise the recommendations. Upon detecting a change, the system may re-calculate the projected/simulated return. In some configurations, the system may, upon receiving proper authorization from the user, allocate the user's capital to the recommended investment vehicles by creating an account for the user. This method may be used for anyone who desires to construct a portfolio and maximize returns subject to a specific set of constraints (e.g., given a unit/preference of risk or predetermined investments).

The methods and systems described herein can also be used to dynamically reallocate assets within a portfolio. In this way, the system may optimize passive investment vehicles for users. For instance, the system may use one or more versions of the Gerber statistic to calculate a relationship between assets within a portfolio. Using the calculated relationships, the system may automatically customize a portfolio in accordance with various criteria. For instance, the system may analyze various assets (stocks) included within an exchange traded fund (ETF), structured product, and/or exchange traded product (ETP) and calculate a Gerber relationship for each asset using the methods discussed herein. The system may then calculate an expected return within a defined timeline for the ETF and determine whether the expected return satisfies a threshold. The threshold may be inputted by a portfolio manager or a system administrator. The threshold may indicate an expected return value or may indicate a risk value associated with the ETF, ETP, and/or structured product. When the system determines that the assets within the ETF do not satisfy the threshold, the system may dynamically revise the assets within the ETF. For instance, the system may iteratively simulate different allocations to different assets within the ETF.

The system may periodically monitor the ETF and dynamically revise its content in accordance with various rules and thresholds in order to adapt to predetermined themes (e.g., ETFs directed towards or isolated from an industry or a sector) or adapt to ongoing market movements and trends. In this way, investors can invest in a dynamic ETF where the system periodically revises the content of the ETF to maximize the return.

Figure 4:
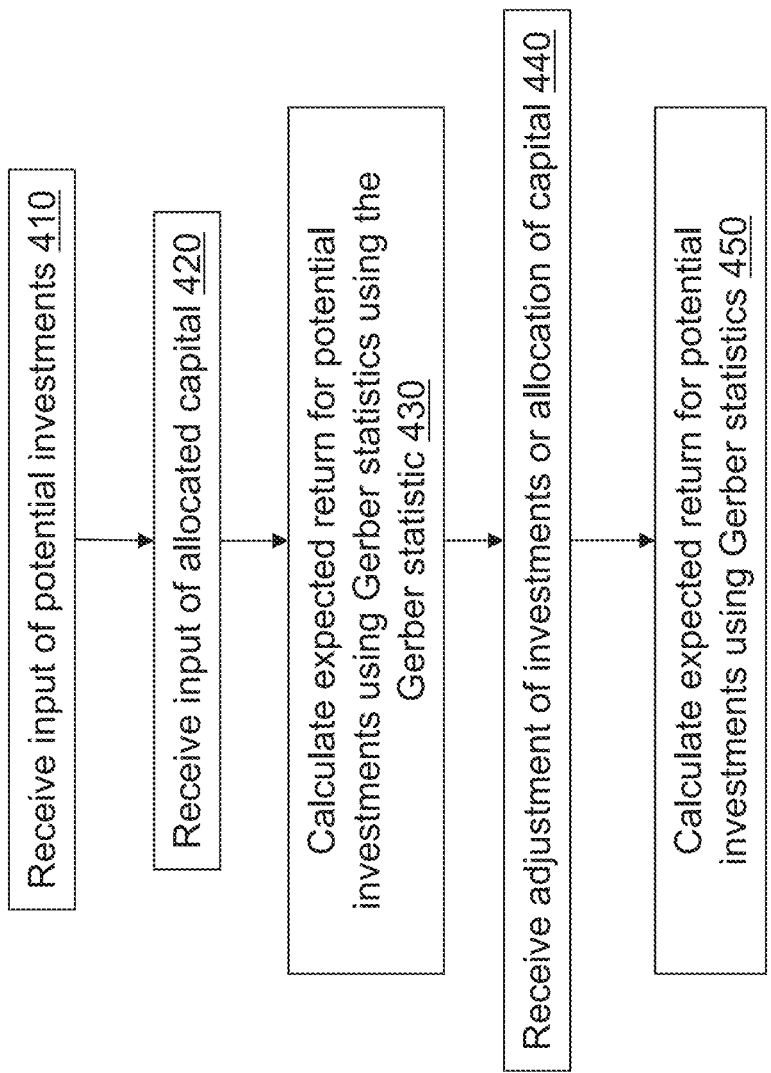
FIG. 4 depicts a method of portfolio construction, according to an embodiment.

In an alternative embodiment, as shown in FIG. 4, a computer system (e.g., system 100 shown in FIG. 2) can determine the risk of a proposed or existing portfolio based upon inputs. The system can receive an input of investments, in step 410. For instance, a user (e.g., investor or a portfolio manager) can enter a list of desired investments (e.g., stocks and ETFs) and the system may display visual aid to describe the risk associated with the portfolio (e.g., FIGS. 6-9).

The system can also receive an amount of capital for each investment, in step 420. For instance, the user can also enter an amount of capital allocated (or desired to be allocated) to each investment. Alternatively, the user can provide a total amount of capital to be allocated to the investments.

The system can then calculate an expected return for the investments using one or more versions of the Gerber statistic, in step 430. The system can use the methods described herein to calculate a relationship for different inputted investments. For instance, the system may first determine whether the investments inputted have a positive or negative union (co-movement). Based on the identified co-movements, the system may then calculate an expected return for the investments in totality. The expected return may be a time-dependent variable. As a result, the system may either calculate the expected return for the investments for a time period identified by the user. Alternatively, the system may generate an expected return for multiple time periods. For instance, the system may calculate and display a projected expected return in short term (e.g., 6 months or 1 year) and medium/long term (e.g., 5 years and 10 years).

Optionally, the user can adjust the investments or an allocation of capital to the investments, in step 440. In response, the system can re-calculate the expected return using the Gerber relationship, in step 450. As described above, the system may display how the capital is allocated to each investment and a corresponding expected return. The system may provide the user the opportunity to simulate different scenarios by allowing the user to revise the investments and/or the capital allocated to each investment. For instance, the user may add or remove an investment to the list of investments. As a result, the system may re-calculate the expected return and display the results. In another example, the user may revise how the capital is allocated to each investment. As a result, the system may re-calculate the expected return and display the results. The system may provide a simulation platform where users can run different scenarios and identify corresponding results.

Using the methods described herein, the system may also recommend an investment strategy that would yield better results. The system may execute multiple scenarios in which different investment strategies are used. For instance, the system may determine whether a linear or non-linear hedge should be used. The system may also determine the type of hedge that should be used (e.g., put option). In another example, the system may determine which (if any) assets should be included or excluded, such as including various environmental, social, and governance (ESG) investments. The system may then display the results generated by simulating different investment strategies and receive a selection from the user. Alternatively, the system may automatically select a best investment strategy based on predetermined rules and criteria (e.g., select the investment strategy that yields the best return in short term or long term).

The system may use the methods and systems described herein to create customized analysis for different portfolios and portfolio managers. For instance, the system may retrieve data needed to perform the analysis and to calculate the Gerber relationship for various assets managed by a particular portfolio manager. The system may first query a database to identify assets being managed by a particular portfolio manager. The system may then determine one or more indices associated with the portfolio manager. The system may then save the data within the pre-loaded cluster or template. A user may access a graphical user interface hosted or generated by the system to execute the pre-loaded clusters.

Figure 6:
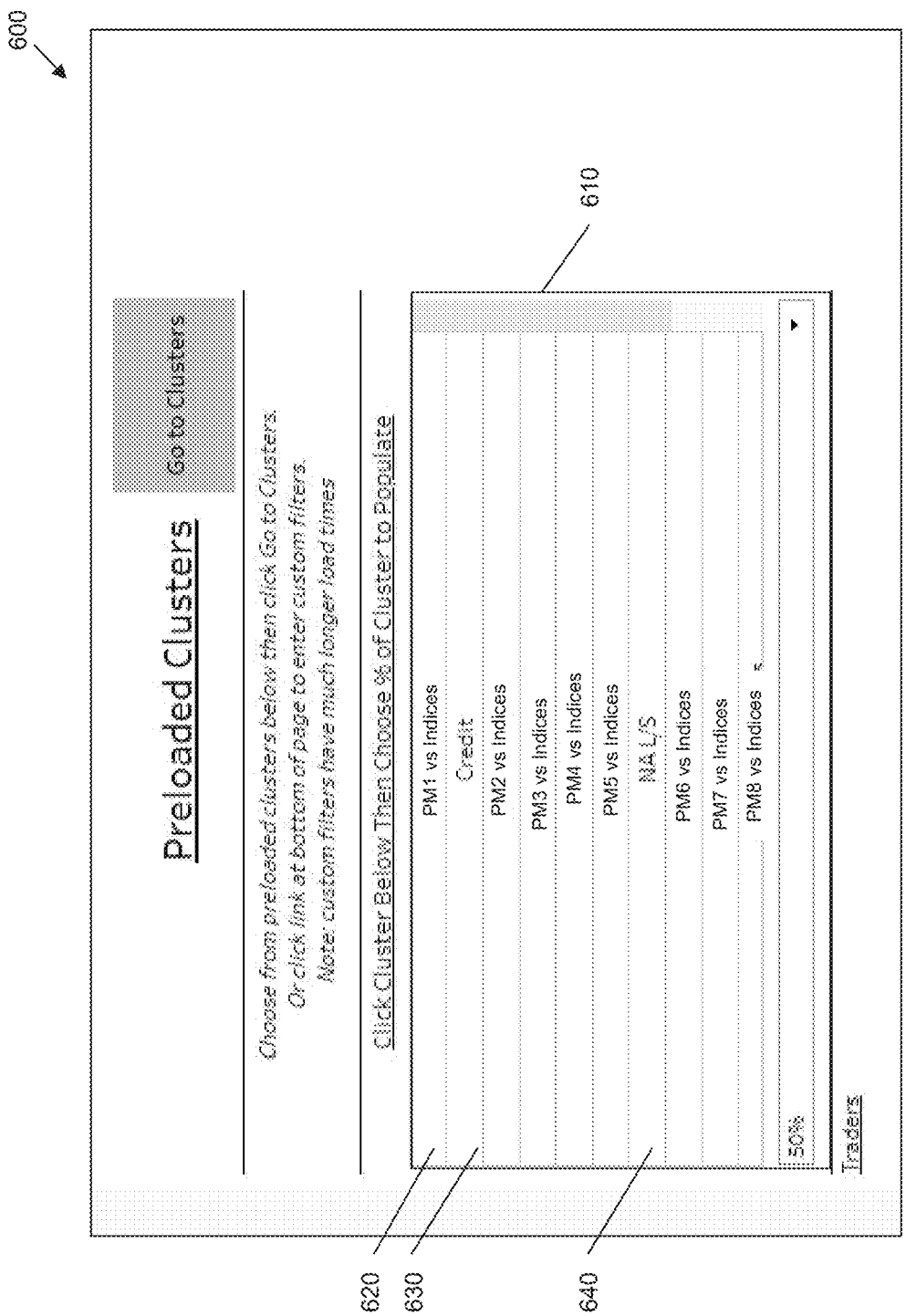

Referring to FIG. 6, when a user accesses a graphical user interface 600, the system displays various preloaded (or pre-generated) clusters and templates to be executed (e.g., clusters represented by a set of graphical components 610). When a user selects a preloaded cluster, the system executes the analytical methods described herein to calculate the Gerber statistic between the assets identified within the preloaded cluster (or inputted by a user). The system may then display the results, such as by displaying any of the graphical user interfaces discussed herein.

The templates and clusters may account for various predetermined strategies for different investments and portfolios, as depicted by the corresponding graphical component. The cluster represented by "credit" (graphical component 630) corresponds to a strategy used by all (or a portion of) portfolio managers. Using preloaded clusters, a user can view results associated with different hedge fund baskets. For instance, when the user selects graphical component 640 for the preloaded cluster of North American Long and Short (NA L/S), the system will show results for a series of predetermined assets associated with the selected basket of assets.

In another example, the preloaded cluster PM1 vs. Indices (represented by graphical component 620) is customized for a particular portfolio manager, PM1. The system may calculate a set of attributes (e.g., indices) to be analyzed for assets managed by PM1. The preloaded cluster for PM1 may also include the assets being managed by PM1. Additionally or alternatively, the preloaded cluster represented by the graphical component 620 may also include relevant indices that have been selected for PM1 (based on various rules). The system may use various rules and computer models to determine an ideal set of indices for each user (e.g., each portfolio manager). For instance, the system may include S&P indices for PM1. However, because PM1 is a merger arbitrage portfolio manager, the system may also include indices that are specific to merger arbitrage portfolios (e.g., indices that track the performance of mergers) because PM1 manages assets that may have risk regarding different market factors and market measures. Therefore, the preloaded cluster for PM1 may use different indices as the preloaded cluster for other portfolio managers (e.g., PM5).

In another example, the system may evaluate a PM's portfolio of returns both at the portfolio level and 'sub-portfolios' consisting of a subset of investments in the portfolio. The system could then evaluate the list of assets that exhibit the greatest relationships with the portfolio's returns against the investments in the portfolio. In doing so, the system could help identify themes or relationships amongst investments in the portfolio. The system can also identify investments that are contributing to that relationship allowing for better overall allocation of resources. The system may re-use the identified relationships or themes by applying them to other PMs or portfolios and their corresponding assets.

The system may periodically execute the preloaded clusters, such as daily, weekly, or any other frequency determined by a system administrator. The system may have the results available, such that different authorized users can view the results by interacting with the graphical user interface 600.

Figure 7:
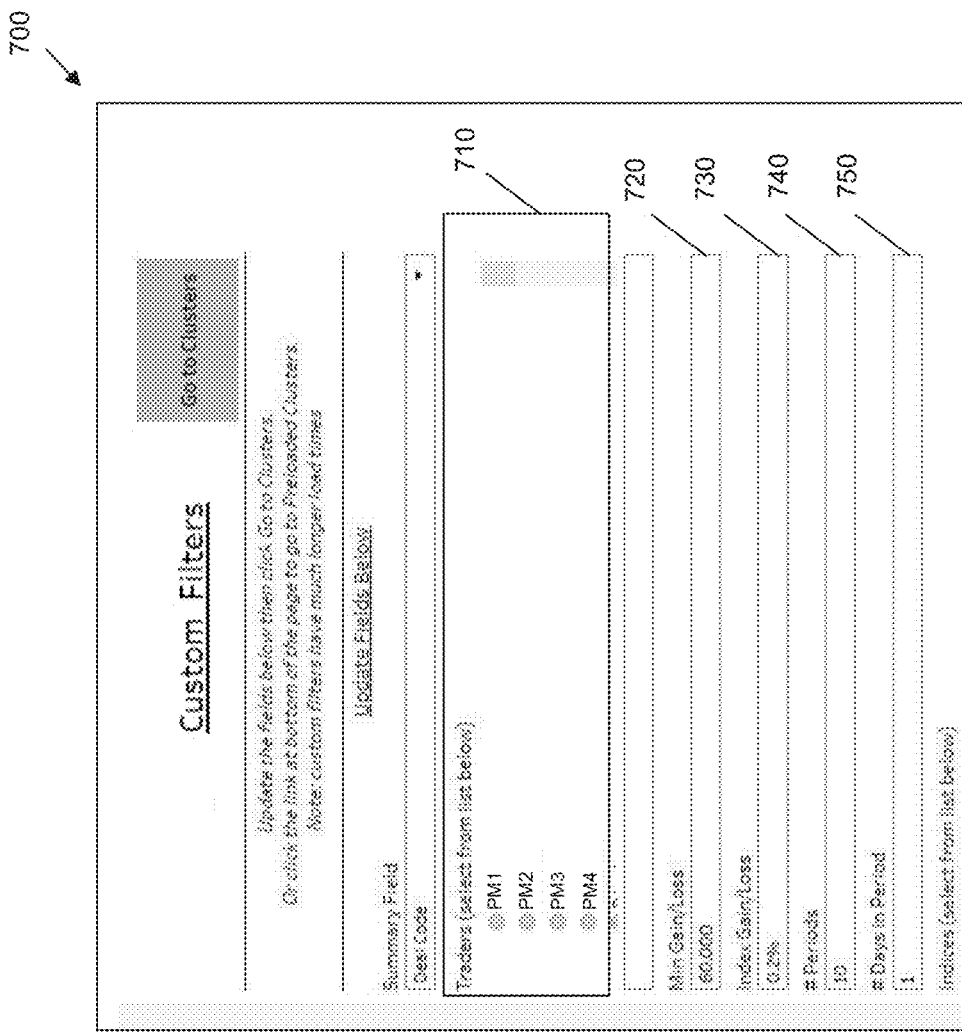

The system may also allow users to generate customized data analysis based on their chosen criteria. As depicted in FIG. 7, the system may allow a user to generate any combination of data to be analyzed per user selections. Using the input elements depicted in the graphical user interface 700, a user may create a customized way of analyzing the data. For instance, the user may select trades from the list of input elements within the set of graphical components 710, select gains/losses using the input element 720, select an index gain/loss using the input element 730, and select the observation period using the input elements 740 and 750. Upon generating a customized cluster, the system may analyze the data and direct the user to FIGS. 8-9.

Referring now to FIG. 8, an example of a graphical user interface displayed by the system is depicted. The system may use the preloaded cluster (FIG. 6) or customized clusters (FIG. 7) to analyze the data. Based on the Gerber relationships between various assets or variables (e.g., deal records), the system can display the extent of a relationship between two or more assets or the relationship of an asset to an index, as depicted in the graphical user interface 800. The relationship can be depicted in a format whereby assets moving in the same direction and having a positive relation may be depicted differently (e.g., via alphanumerical representation (e.g., numbers or classes), different size, color, or shape) than those assets moving in a different direction and having a negative relation. The system may employ an algorithm to highlight those assets that have, for example, exhibited the most significant moves and/or have the most significant relationships.

The grid depicted in FIG. 8 has an x-axis with a separate column for each asset and a y-axis with a separate row for each asset. The intersection between an asset on the x-axis and an asset on the y-axis indicates the Gerber relationship between the two assets. The Gerber relationship can be shown as a number by applying one or more versions of the Gerber statistic methods on the corresponding data (e.g., performance of each asset in accordance with a particular index within a defined observation period). The system can display an indicator representing the similarity of movements across assets. For example, the system can provide a percentage value representing the number of periods where the two assets moved in the same direction minus the number of periods where the two assets moved in opposite directions, and that number is divided by the total number of periods exceeding the threshold, as shown in box 810 (e.g., 40%). For example, a percentage of 40% may be the result of seven periods where the two deal code records moved in the same direction minus three periods where the deal code records moved in opposite directions, divided by ten periods that exceed the threshold criteria for that date range.

The system may also display the result in another visual format, as depicted in FIG. 9. As depicted, the graphical user interface 900 shows a scatter plot where different assets/variables are represented by different graphical indicators (e.g., data points) separated into different quadrants. The graphical user interface 900 includes four quadrants separated by various predetermined and/or revisable thresholds. For brevity and clarity, the graphical user interface 900 depicts co-movement of two assets (deal records). However, in other embodiments, a user may customize one or more assets, such that more assets are shown. In some configurations, the system may direct the user to the graphical user interface 900 when the user interacts with any of the indicators shown in FIG. 8. For instance, when a user clicks on the box 810, the system directs the user to the graphical user interface 900 where the corresponding two assets are compared using one or more versions of the Gerber statistic.

In FIG. 9, a first axis 901 represents movements of a first asset (GS-HF-LS) and a second axis 902 represents movements of a second asset (EEM). A threshold value for movement of either asset may be set by the system and/or the user or the system administrator, which is depicted by threshold values 903, 904, 905, and 906. These threshold values create four quadrants: quadrant 910 (Q1) representing both assets moving in a positive direction beyond the threshold, quadrant 920 (Q2) representing the first asset moving in a negative direction beyond the threshold and the second asset moving in a positive direction beyond the threshold, quadrant 930 (Q3) representing both assets moving in a negative direction beyond the threshold, and quadrant 940 (Q4) representing the first asset moving in a positive direction beyond the threshold and the second asset moving in a negative direction beyond the threshold. Quadrants 910, 930 represent the instances of a positive union, whereas quadrants 920, 940 represent the instances of a negative union. The system, by default, may identify and use whatever thresholds were used in the portfolio level analysis. However, these thresholds are not limited to the thresholds used at the portfolio level analysis. For instance, an end user (PM) or a system administrator may revise the thresholds accordingly.

In the depicted embodiment, the grid uses daily measurements over an observation period indicated by the graphical component 960 (e.g., Mar. 22, 2021 to Apr. 5, 2021). The observation period may be revised by the user. For instance, the user may instruct the system to analyze the data for a longer period of time (e.g., 45 days) or analyze the data based on bi-weekly measurements instead of daily measurements. For each day within the observation period indicated within the graphical component 960, a point is positioned on the grid depicted within the graphical user interface 900 corresponding to the movements of the two assets. For instance, points 911-913 and 931-934 represent co-movement of the two assets. In contrast, points 921-923 represent a negative union (e.g., opposite of the co-movement) of the two assets.

The system may also display the graphical component 950 where the calculated relationship for each day is presented. In some configurations, the user may interact with the values depicted within the graphical component 950 and the system may direct the user to another page displaying more detailed data (e.g., positions for each asset or market movement).

Because GS1 and GS2 are less restrictive than GS, the system can analyze more data points without excluding them due to the data points falling below the restrictive thresholds. As a result, the graphical user interface 900 does not include any data points that fall in between the thresholds 903-906.

While the embodiment shown in FIG. 9 relates to measuring movements in monetary value with a threshold specified in dollars, it is understood that any suitable measurement or unit can be used for movement and any suitable measurement or unit can be used as a threshold. For example, the movement measurement or a threshold can be absolute (e.g., a number of units) or relative (e.g., a percentage). In some embodiments, a threshold can be a relative measurement based on past behavior of the assets. The threshold can be based upon a standard deviation of past asset movement, whereby a lower standard deviation can represent a lower threshold more sensitive to asset movement. For example, a threshold may be set to a multiple of the asset's standard deviations based on past behavior. In some embodiments, a threshold may be dynamically adjusted for each measurement based on recent behavior of the asset. In such embodiments, the threshold may automatically change over time as the behavior of the asset evolves.

While the embodiment shown in FIG. 9 applies the same threshold value to both assets, it is understood that a different threshold can be applied to each asset. In some embodiments, each asset can have its own threshold based upon that particular asset's unique characteristics or past performance. For example, the threshold for each asset may be selected so that it corresponds to the movement magnitude, volatility, or other historical behavior of each asset. In one embodiment, a user can adjust the threshold for one or both assets, a feature that may be used to manually adjust for measurement sensitivity. In other examples, the system may consider the performance data in terms of a changing of levels associated with performance of the asset, such as percentage change (not absolute amount), log, simple difference between two assets, deviation from a trend, and the like.

In some configurations, the system may identify different benchmarks and indices to be used in the calculations discussed herein. The system may dynamically monitor performance of a certain sector or index. If the performance satisfies a threshold, the system may generate a recommendation accordingly. For instance, if the system determines that the retail sector has had a sudden spike, the system may recommend calculating a portfolio's exposure against indices corresponding to the retail sector. The system may generate an electronic notification informing the user (e.g., portfolio manager) that the retail sector's performance has had a sudden spike. The notification may then recommend using the retail sector as a benchmark, such that a portfolio's exposure is calculated against new indices. Upon receiving authorization from the user or a system administrator, the system may then re-analyze the data using the updated (or additional) benchmarks.

The system may continuously monitor the market to recommend new benchmarks, such that data is periodically calculated using updated benchmarks that reflect the latest market movements.

The system may also generate a confidence score for the results calculated. For instance, when a positive or negative union is identified, the system may determine whether the data indicating the result is statistically significant using another statistical significance protocol (after making distributional assumptions). Specifically, the system may determine a degree of statistical significance for a positive or a negative union. Statistical significance indicates whether the results generated by applying one or more versions of the Gerber statistic to the data is likely to occur randomly (by chance) or likely to be attributable to a specific cause. If the Gerber statistic is applied to a small data sample (e.g., small number of observations), it may not yield results that are statistically significant. Therefore, the system may assign a low confidence score to the result. If the system determines that the results have a low confidence score (e.g., a confidence score that is less than a threshold), the system may recommend increasing the observation period to re-analyze the data using a bigger sample size. For instance, if the user instructs the system to analyze performance data for a week (e.g., via interacting with the input elements of the graphical component 960), the system may display a message that recommends increasing the time to a month (and/or increasing the frequency of observations to hourly) because a week (and/or daily frequency) may not yield results that are statistically significant.

In some configurations, the system may dynamically calculate thresholds that would yield results with high confidence score (e.g., results that are statistically significant). The system may vary the threshold (e.g., thresholds that are visually depicted as lines 903, 904, 905, and 906). For instance, instead of receiving the observation period from a user, the system may automatically analyze the market based on the selected indices and determine thresholds that would yield better results. In this way, the user may only select the assets to be analyzed and the system may automatically determine a suitable time threshold that are customized based on market volatility, availability of data, historical observations, and the like. The thresholds may also be calculated based on the assets to be analyzed.

The system may determine the time threshold based on various attributes of the assets to be analyzed, such as price, trade volume, and the like. For example, a first stock may have more observable data points in a shorter period of time because the first stock has been traded more frequently than a second stock. Therefore, the system may calculate a different observation period for the first stock than the second stock. In another example, the system may impose additional thresholds or may segment the time windows differently based on trading price and/or volume. For instance, the system may only analyze the data when a stock has been traded more than a certain volume. In another example, the system may segment the observable periods of time into bi-daily (and not daily) segments because a particular stock has a high trading volume.

In another example, an asset (e.g., a particular stock) may be continuously traded during market hours. As a result, the system may compare ownership of a stock (pricing every second) in light of the capital invested in a strategy with a lock-up or less frequent observable returns (e.g. hedge fund or private equity).

The system may also use different versions of the Gerber statistic described herein to show multiple sets of results. While FIG. 9 depicts one set of results, the system may utilize GS, GS2, and/or GS3 to generate different sets of results. In some configurations, the graphical user interface 900 may include an input element (e.g., toggle, drop down menu, or a radio button) that allows the user to instruct the system to use a particular version of the Gerber statistic to calculate the results. In some configurations, the system may simultaneously display two or three sets of results where each set of results is calculated using a different version of the Gerber statistic. The system may also display an average of multiple Gerber statistics as the only set of results.

The system may also analyze the shape of the scatter plot (e.g., arrangement and shape of the data points within each quadrant) to recommend an investment strategy. For instance, the arrangement of the data points may indicate that when the market is in red (e.g., lower than a threshold), assets within a portfolio experience a decreased value. However, the assets are not participating in the market when the market is in green. Therefore, the system may recommend a new investment strategy (e.g., purchasing put options). In another example, if a portfolio manager has invested in stock A and shorted stock B, the portfolio is exposed to a high risk. However, based on the system's recommendation, the portfolio manager may purchase put options instead of shorting stock B. As a result, the portfolio's risk is limited to a fixed amount. In another example, if the system determines that a linear hedge has caused noisy data, the system may recommend a non-linear hedge.

The system may retrieve one or more of the criteria, thresholds, or other data needed to generate the graphical user interface 900 from a template (pre-made cluster) associated with the user viewing the graphical user interface 900 and/or a user associated with the assets analyzed (e.g., portfolio manager). For instance, a user may login to the electronic platform provided by the system and select a generated cluster. Upon instructing the system to execute the generated cluster/template, the system may automatically retrieve the data necessary to generate the graphical user interface 900. For instance, the system may retrieve the customized observation period thresholds, indices, and other data from the cluster/template to calculate the relationships discussed herein.

Figure 10:
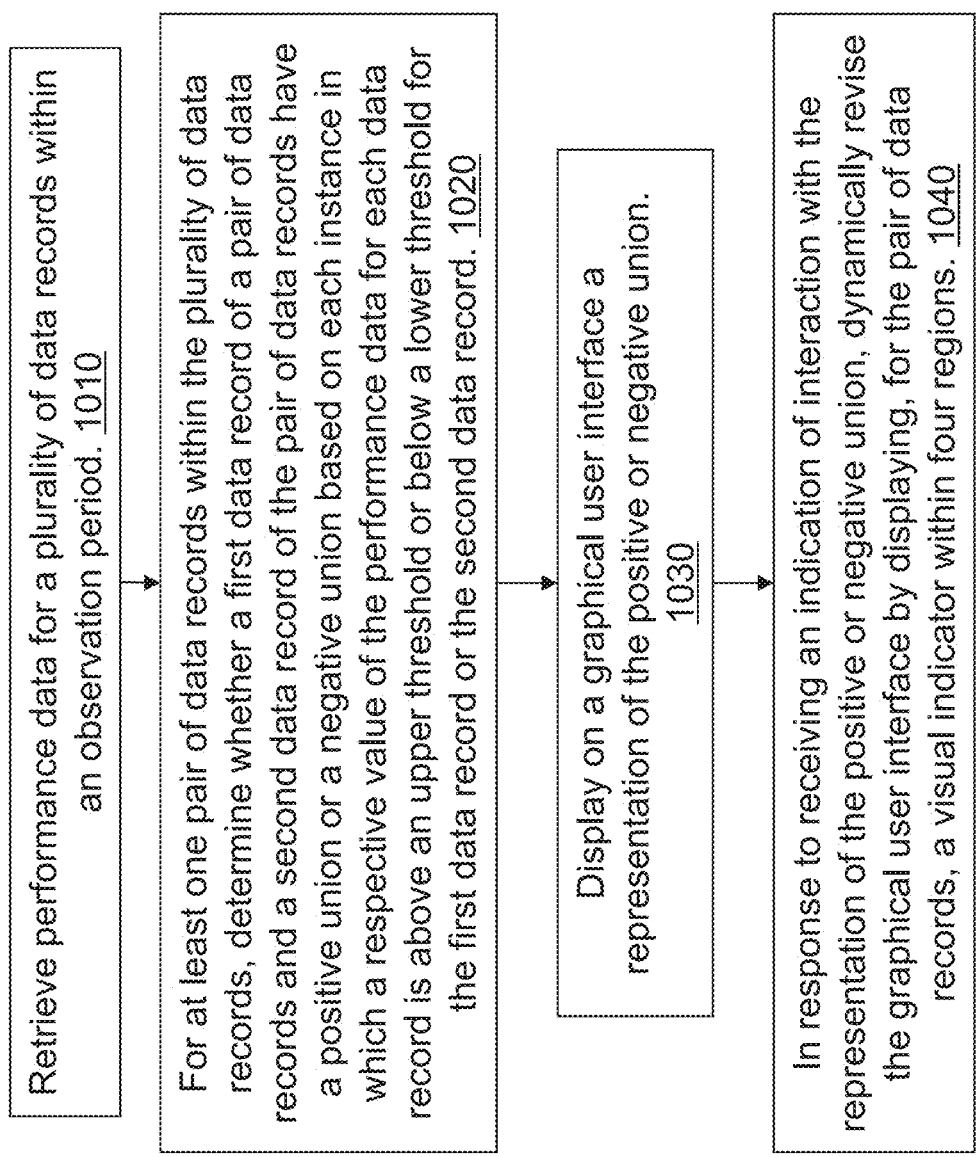
FIG. 10 depicts a method of portfolio construction, analysis, and visualization, according to an embodiment.

Referring now to FIG. 10, a method 1000 depicts a method for portfolio construction, analysis, and visualization according to an embodiment. The method 1000 may be performed by a server, such as the server within the system 100 (FIG. 1).

At step 1010, the system may retrieve performance data for a plurality of data records within an observation period. The system may query and retrieve performance data associated with one or more assets. The performance data may be filtered in accordance with various criteria, such as observation period thresholds, performance values with respect to particular indices, and the like. In some embodiment, the above-described criteria may be retrieved from pre-generated templates/clusters. For instance, based on a user identifier, the system may retrieve an appropriate template/cluster (e.g., a template/cluster generated for a particular portfolio manager). In other embodiments, the above-described criteria may be inputted by a user (e.g., FIG. 7).

At step 1020, the system may for at least one pair of data records within the plurality of data records, determining whether a first data record of a pair of data records and a second data record of the pair of data records have a positive union or a negative union based on each instance in which a respective value of the performance data for each data record is above an upper threshold or below a lower threshold for the first data record or the second data record. At step 1030, the system may display on a graphical user interface, a representation of the positive or negative union.

The system may apply various analytical methods discussed herein to identify relationships between data points representing different assets. For instance, the system may use one or more versions of the Gerber statistic to populate the graphical user interface described in FIG. 8.

At step 1040, the system may in response to receiving an indication of interaction with the representation of the positive or negative union, dynamically revising, by the server, the graphical user interface by displaying, for the pair of data records, a visual indicator within four regions, wherein: a first region represents positive union with respect to the upper threshold and the lower threshold, a second region represents negative union with respect to the upper threshold and the lower threshold, a third region represents positive union with respect to the lower threshold and negative union with respect to the upper threshold, and a fourth region represents negative union with respect to the lower threshold and positive union with respect to the upper threshold.

When a user interacts with an interactive element displayed (e.g., when a user interacts with the box 810 depicted in FIG. 8), the system may direct the user to a new page or may dynamically revise the graphical user interface. The new page or the revised graphical user interface may present analysis of two or more assets (e.g., a portfolio), such as depicted in FIG. 9.

Unless specifically stated otherwise as apparent from the following discussion, it is appreciated that throughout the description, discussions utilizing terms such as "creating," "executing," "providing," "calculating," "processing," "computing," "transmitting," "receiving," "determining," "displaying," "identifying," "presenting," "establishing," or the like, can refer to the action and processes of a data processing system, or similar electronic device, that manipulates and transforms data represented as physical (electronic) quantities within the system's registers or memories into other data similarly represented as physical quantities within the system's memories or registers or other such information storage, transmission or display devices. The system can be installed on a mobile device.

The embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but not limited to, any type of disk including floppy disks, optical disks, CD-ROMs and magnetic-optical disks, read only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

The embodiments described herein are described as software executed on at least one server, though it is understood that embodiments can be configured in other ways and retain functionality. The embodiments can be implemented on known non-transitory devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to the disclosure.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components can be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms "determine," "calculate" and "compute," and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A method comprising:
retrieving, by a server, performance data for a plurality of data records within an observation period;
for at least one pair of data records within the plurality of data records, determining, by the server, whether a first data record of a pair of data records and a second data record of the pair of data records have a positive union or a negative union based on each instance in which a respective value of the performance data for each data record is above an upper threshold or below a lower threshold for the first data record or the second data record;
displaying, by the server on a graphical user interface, a representation of the positive or negative union; and
in response to receiving an indication of interaction with the representation of the positive or negative union, dynamically revising, by the server, the graphical user interface by displaying, for the pair of data records, a visual indicator within four regions, wherein:
a first region represents positive union with respect to the upper threshold and the lower threshold,
a second region represents negative union with respect to the upper threshold and the lower threshold,
a third region represents positive union with respect to the lower threshold and
negative union with respect to the upper threshold, and
a fourth region represents negative union with respect to the lower threshold and positive union with respect to the upper threshold.

2. The method of claim 1, further comprising:
retrieving, by the server, at least one of the observation period, the upper threshold, or the lower threshold from a template that is customized for a user or a portfolio associated with the plurality of data records.

3. The method of claim 2, wherein the value of the performance data for each data record corresponds to an index, and wherein the index is selected from the template.

4. The method of claim 1, further comprising:
calculating, by the server, a confidence score for the positive or negative union, the confidence score corresponding to a statistical significance value associated with the performance data analyzed to calculate the positive or negative union.

5. The method of claim 4, further comprising:
when the confidence score is below a confidence threshold, dynamically increasing, by the server, a length of the observation period.

6. The method of claim 5, further comprising:
determining, by the server, whether the first data record of the pair of data records and the second data record of the pair of data records have a positive union or a negative union in accordance with a second observation period that adjusts a starting time.

7. The method of claim 1, wherein representation of the positive or negative union is an alphanumerical representation or a graphical representation.

8. The method of claim 1, wherein the four regions are visually separated in accordance with the upper threshold and the lower threshold.

9. The method of claim 1, further comprising:
calculating, by the server, mean-variance optimized portfolio construction, wherein covariance is based on a relationship between the pair of data records having a positive union or a negative union, wherein the server replaces at least one data record within the plurality of data records with a new data record, wherein the new data record has positive union with the first data record or the second data record; and
periodically monitoring, by the server, the performance data for the pair of data records, wherein when at least one of the positive union or the negative union changes, the server re-calculates the mean-variance optimized portfolio construction.

10. The method of claim 1, wherein a fifth region represents performance data associated with data records that are between the upper threshold and the lower threshold.

11. A method comprising:
retrieving, by a server, at least one of an observation period, an upper threshold, or a lower threshold from a template;
for at least one pair of data records within a plurality of data records, determining, by the server, whether a first data record of a pair of data records and a second data record of the pair of data records have a positive union or a negative union based on each instance in which a respective value of a performance data for each data record is above the upper threshold or below the lower threshold for the first data record or the second data record;
displaying, by the server on a graphical user interface, for the pair of data records, a visual indicator within four regions, wherein:
a first region represents positive union with respect to the upper threshold and the lower threshold,
a second region represents negative union with respect to the upper threshold and the lower threshold,
a third region represents positive union with respect to the lower threshold and
negative union with respect to the upper threshold, and
a fourth region represents negative union with respect to the lower threshold and positive union with respect to the upper threshold.

12. The method of claim 11, wherein the template is customized for a user or a portfolio associated with the plurality of data records.

13. The method of claim 11, wherein the value of the performance data for each data record corresponds to an index, and wherein the index is selected from the template.

14. The method of claim 11, wherein representation of the positive or negative union is an alphanumerical representation or a graphical representation.

15. The method of claim 11, wherein the four regions are visually separated in accordance with the upper threshold and the lower threshold.

16. The method of claim 11, further comprising:
calculating, by the server, mean-variance optimized portfolio construction, wherein covariance is based on a relationship between the pair of data records having a positive union or a negative union, wherein the server replaces at least one data record within the plurality of data records with a new data record, wherein the new data record has positive union with the first data record or the second data record.

17. The method of claim 16, further comprising:
periodically monitoring, by the server, the performance data for the pair of data records, wherein when at least one of the positive union or the negative union changes, the server re-calculates the mean-variance optimized portfolio construction.

18. The method of claim 11, wherein a fifth region represents performance data associated with data records that are between the upper threshold and the lower threshold.

19. A method comprising:
retrieving, by a server, performance data for a plurality of data records within an observation period;
for at least one pair of data records within the plurality of data records, determining, by the server, whether a first data record of a pair of data records and a second data record of the pair of data records have a positive union or a negative union based on each instance in which a respective value of the performance data for each data record is above an upper threshold or below a lower threshold for the first data record or the second data record;
displaying, by the server on a graphical user interface, for the pair of data records, a visual indicator within four regions, wherein:
a first region represents positive union with respect to the upper threshold and the lower threshold,
a second region represents negative union with respect to the upper threshold and the lower threshold,
a third region represents positive union with respect to the lower threshold and negative union with respect to the upper threshold, and
a fourth region represents negative union with respect to the lower threshold and positive union with respect to the upper threshold; and
dynamically increasing, by the server, a length of the observation period based on a confidence score for the positive or negative union.

20. The method of claim 19, wherein the confidence score corresponds to a statistical significance value associated with the performance data analyzed to calculate the positive or negative union.

21. The method of claim 20, wherein the server dynamically increases the length of the observation period when the confidence score is below a confidence threshold.

22. The method of claim 19, further comprising:
determining, by the server, whether the first data record of the pair of data records and the second data record of the pair of data records have a positive union or a negative union in accordance with a second observation period that adjusts a starting time.

23. The method of claim 19, further comprising:
calculating, by the server, mean-variance optimized portfolio construction, wherein covariance is based on a relationship between the pair of data records having a positive union or a negative union, wherein the server replaces at least one data record within the plurality of data records with a new data record, wherein the new data record has positive union with the first data record or the second data record.

24. The method of claim 23, further comprising:
periodically monitoring, by the server, the performance data for the pair of data records, wherein when at least one of the positive union or the negative union changes, the server re-calculates the mean-variance optimized portfolio construction.

25. The method of claim 19, wherein a fifth region represents performance data associated with data records that are between the upper threshold and the lower threshold.

* * * * *